(12) United States Patent
Takabayashi et al.

(10) Patent No.: US 9,400,324 B2
(45) Date of Patent: Jul. 26, 2016

(54) RADAR DEVICE

(71) Applicants: Yuki Takabayashi, Chiyoda-ku (JP);
Yasushi Obata, Chiyoda-ku (JP);
Hiroshi Kameda, Chiyoda-ku (JP)

(72) Inventors: Yuki Takabayashi, Chiyoda-ku (JP);
Yasushi Obata, Chiyoda-ku (JP);
Hiroshi Kameda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 373 days.

(21) Appl. No.: 14/237,104

(22) PCT Filed: Nov. 22, 2012

(86) PCT No.: PCT/JP2012/080348
§ 371 (c)(1),
(2) Date: Feb. 4, 2014

(87) PCT Pub. No.: WO2013/088938
PCT Pub. Date: Jun. 20, 2013

(65) Prior Publication Data
US 2014/0184437 A1   Jul. 3, 2014

(30) Foreign Application Priority Data

Dec. 12, 2011   (JP) .................................. 2011-271320

(51) Int. Cl.
*G01S 7/35*   (2006.01)
*G01S 13/66*   (2006.01)
(Continued)

(52) U.S. Cl.
CPC . *G01S 7/35* (2013.01); *G01S 7/352* (2013.01); *G01S 13/345* (2013.01); *G01S 13/584* (2013.01); *G01S 13/66* (2013.01)

(58) Field of Classification Search
CPC ........................................................ G01S 7/35
USPC ........................................................ 342/107
See application file for complete search history.

(56) References Cited

U.S. PATENT DOCUMENTS 6,011,507 A * 1/2000 Curran .................... G01S 7/354
342/70
6,317,073 B1   11/2001 Tamatsu et al.
(Continued)

FOREIGN PATENT DOCUMENTS

JP   5 142337   6/1993
JP   11 271429   10/1999
(Continued)

OTHER PUBLICATIONS

Office Action issued on Oct. 14, 2014, in Japanese Patent Application No. 2013-549192 with partial English translation.
(Continued)

*Primary Examiner* — Peter Bythrow
*Assistant Examiner* — Helena Seraydaryan
(74) *Attorney, Agent, or Firm* — Oblon, McClelland, Maier & Neustadt, L.L.P.

(57) ABSTRACT

A radar device including an up-chirp tracking filter that performs a tracking process using a beat frequency at the time of an up-chirp to acquire a beat frequency, a down-chirp tracking filter that performs a tracking process using a beat frequency at the time of a down-chirp to acquire a beat frequency, target detectors that calculate distance and speed estimated values of the target for the chirps from beat frequency time series data about the chirps; an identical target determinator that determines whether or not the target detected for each of the chirps is an identical target using the distance and speed estimated values, and a distance and speed calculator that calculates a distance and a speed of the target using the beat frequency of the target which is determined to be an identical target.

9 Claims, 16 Drawing Sheets

(51) Int. Cl.
*G01S 13/34* (2006.01)
*G01S 13/58* (2006.01)

(56) References Cited

U.S. PATENT DOCUMENTS

| | | | |
|---|---|---|---|
| 8,085,184 B2 | 12/2011 | Takabayashi et al. | |
| 2004/0252047 A1* | 12/2004 | Miyake | G01S 13/34 342/107 |
| 2009/0046000 A1* | 2/2009 | Matsuoka | G01S 13/426 342/147 |
| 2009/0309782 A1* | 12/2009 | Takabayashi | G01S 13/343 342/105 |
| 2010/0085240 A1* | 4/2010 | Kai | G01S 3/74 342/108 |
| 2010/0271258 A1* | 10/2010 | Takabayashi | G01S 13/931 342/107 |
| 2011/0122013 A1* | 5/2011 | Takeya | G01S 13/44 342/109 |
| 2011/0215964 A1* | 9/2011 | Shirakawa | G01S 13/003 342/25 R |
| 2012/0268316 A1* | 10/2012 | Kanamoto | G01S 3/74 342/158 |

FOREIGN PATENT DOCUMENTS

| | | |
|---|---|---|
| JP | 2000 147102 | 5/2000 |
| JP | 2005 55240 | 3/2005 |
| JP | 2008-8691 A | 1/2008 |
| JP | 2010 19824 | 1/2010 |
| JP | 2010 256083 | 11/2010 |
| JP | 2011 149898 | 8/2011 |
| JP | 2011-220727 A | 11/2011 |

OTHER PUBLICATIONS

International Search Report Issued Feb. 12, 2013 in PCT/JP12/080348 Filed Nov. 22, 2012.
Extended European Search Report issued on Aug. 25, 2015 in European Patent Application No. 12857940.6.

* cited by examiner

Speed In Traveling Direction

RADAR DEVICE

FIELD OF THE INVENTION

The present invention relates to a radar device, such as an FMCW (Frequency Modulated Continuous Wave) radar, which is used for avoidance of collision of a moving object, travelling while keeping a fixed following distance, etc., and which detects a relative speed and a distance with respect to a target existing outside the moving object by using transmission and reception of a radar wave.

BACKGROUND OF THE INVENTION

A conventional radar device transmits, as a radar wave, a transmission signal which is frequency-modulated with a triangle-shaped modulation signal, and whose frequency is repeatedly increased and decreased at fixed time intervals, as shown in FIG. 16. The radar device then receives a reflected wave generated by reflection of this radar wave from a target and generates a received signal, and also generates a beat signal by mixing the received signal with the transmission signal. The radar device then specifies the frequency of this beat signal (referred to as the beat frequency from here on) both for a sweep interval at the time of an up-chirp during which the frequency of the transmission signal increases, and for a sweep interval at the time of a down-chirp during which the frequency of the transmission signal decreases. The radar device then calculates the distance R to the target and the speed V relative to the target by using the following equations (1) and (2) (or the following equations (3) and (4)) on the basis of this specified beat frequency $f^u$ at the time of an up-chirp, and this specified beat frequency $f^d$ at the time of a down-chirp.

$$f^u = \frac{2B}{cT}R + \frac{f_0}{c}2V \quad (1)$$

$$f^d = \frac{2B}{cT}R - \frac{f_0}{c}2V \quad (2)$$

$$R = \frac{cT}{4B}(f^u + f^d) \quad (3)$$

$$V = \frac{c}{4f_0}(f^u - f^d) \quad (4)$$

where B shows the width of the frequency variation range of the transmission signal, $f_0$ shows the center frequency of the transmission signal, T shows the time required for the modulation of one cycle, and c shows the speed of light. It is assumed that the modulation time T is short, and the distance R to the target and the speed V relative to the target do not vary between an up-chirp and a down-chirp.

As mentioned above, the conventional radar device can detect the distance to a target and the speed relative to the target by pairing the beat frequency at the time of an up-chirp with the beat frequency at the time of a down-chirp. However, an offset occurs between the beat frequency acquired at the time of an up-chirp and the beat frequency acquired at the time of a down-chirp even though they are the ones associated with an identical target. Particularly in an environment where a plurality of targets exist, i.e., a plurality of beat frequencies exist, it is necessary to determine which beat frequency at the time of an up-chirp matches that at the time of a down-chirp, but it is very difficult to carry out the determination.

The above-mentioned problem will be explained by using FIGS. 17 and 18. For example, it is assumed that a target is detected both for an up-chirp and for a down-chirp, as shown in FIG. 18, by using a transmission pattern in which an up-chirp and a down-chirp are repeated for each scan, as shown in FIG. 17. In FIG. 18, a mark □ shows a target 1, a mark ○ shows a target 2, and a mark x shows an unnecessary signal, and it is assumed that the target 2 is not detected at the time of transmitting a down-chirp. Because an offset due to a target speed occurs between an up-chirp and a down-chirp, a plurality of combinations are generated. Therefore, an unnecessary target occurs and there is also an undetectable target like the target 2. The following methods are disclosed as a measure taken against this problem (for example, refer to patent reference 1 to 4).

The patent reference 1 discloses a method of arranging beat frequencies acquired according to sweep period in ascending order of beat frequency, and pairing the beat frequency at the time of an up-chirp with the beat frequency at the time of a down-chirp in such a way that the arrangement order is maintained. As a result, an environment including two or more targets can be supported. However, when a false alarm occurs either at the time of transmitting an up-chirp or at the time of transmitting a down-chirp, and there exists a beat frequency caused by an unnecessary signal component other than signals associated with a target in the case of using this method, i.e., when target detection conditions differ between at the time of transmitting an up-chirp and at the time of transmitting a down-chirp and the number of beat frequencies at the time of transmitting an up-chirp is not the same as that at the time of transmitting a down-chirp, there is a high possibility that pairing between beat frequencies (simply referred to pairing from here on) is not carried out correctly.

Further, patent reference 2 discloses a method of predicting the current distance to a target and the current speed relative to the target on the basis of the distance to the target and the speed relative to the target which were detected in the past, and calculates a beat frequency at the time of transmitting an up-chirp and a beat frequency at the time of transmitting a down-chirp on the basis of this predicted values. Then, a detected pair having frequencies close to the pair of these predicted beat frequencies is determined as a true pair. Further, patent reference 3 discloses a method of converting a tracking predicted value into a predicted beat frequency after tracking a target, pairing the predicted beat frequency with an inputted beat frequency, and updating the tracking estimated value. However, a problem with these methods is that when a target detected in the past or a target for tracking is an erroneous target, the erroneous target remains continuously and this causes errors in the subsequent target detection.

On the other hand, patent reference 4 discloses a method of, as shown in FIG. 19, directly tracking the beat frequency acquired at the time of transmitting an up-chirp and the beat frequency acquired at the time of transmitting a down-chirp, and calculating the distance to the target and the speed relative to the target by using beat frequency time series data having a correlation in a temporal direction. However, a problem with this method is that the distance and the speed are calculated based on the premise that the speed does not vary between scans (the speed is constant), the accuracy of estimating the distance and the accuracy of estimating the speed degrade on conditions that the premise is not established.

RELATED ART DOCUMENT

Patent Reference

Patent reference 1: Japanese Unexamined Patent Application Publication No. Hei 5-142337

Patent reference 2: Japanese Unexamined Patent Application Publication No. Hei 11-271429
Patent reference 3: Japanese Unexamined Patent Application Publication No. 2005-55240
Patent reference 4: Japanese Unexamined Patent Application Publication No. 2010-019824

SUMMARY OF THE INVENTION

Problems to be Solved by the Invention

As mentioned above, a problem with the conventional methods disclosed by the patent references 1 to 4 is that there is a high possibility that pairing between beat frequencies is not carried out correctly in a multitarget environment or when there exists a beat frequency caused by an unnecessary signal component other than signals associated with a target, and even the use of the method of tracking beat frequencies in a temporal direction to calculate the distance and the speed for each chirp degrades the estimation accuracy compared with the case of using a pair of an up-chirp and a down-chirp.

The present invention is made in order to solve the above-mentioned problem, and it is therefore an object of the present invention to provide a radar device that calculates distance and speed estimated values by carrying out a tracking process for each chirp using beat frequencies, and pairs a beat frequency at the time of an up-chirp with a beat frequency at the time of a down-chirp by using the above-mentioned distance and speed estimated values, thereby being able to improve the accuracy of estimating the distance and the accuracy of estimating the speed.

Means for Solving the Problem

In accordance with the present invention, there is provided a radar device including: radar device including: a transmitter that transmits, as a radar wave, a transmission signal whose frequency is increased and decreased linearly and periodically by a fixed modulation width; a signal processor that receives a reflected wave generated by reflection of the radar wave transmitted by the transmitter from a target and generates a received signal, and that specifies a beat frequency for each chirp on the basis of this received signal and the transmission signal; an up-chirp tracking filter that carries out a tracking process on the basis of the beat frequency associated with an up-chirp specified by the signal processor to acquire a beat frequency of the target, and that calculates distance and speed estimated values of the target on the basis of the above-mentioned beat frequency; a down-chirp tracking filter that carries out a tracking process on the basis of the beat frequency associated with a down-chirp specified by the signal processor to acquire a beat frequency of the target, and that calculates distance and speed estimated values of the target on the basis of the above-mentioned beat frequency; an up-chirp angle tracking filter that carries out a tracking process on a basis of an angle measurement value added to the beat frequency associated with an up-chirp specified by said signal processor, and calculates angle and angular speed estimated values of the target; a down-chirp angle tracking filter that carries out a tracking process on a basis of an angle measurement value added to the beat frequency associated with a down-chirp specified by said signal processor, and calculates angle and angular speed estimated values of the target; an identical target determinator that determines whether or not the target detected for each of the chirps is an identical target on the basis of the distance and speed estimated values of the target and the angle and angular speed estimated values of the target; and a distance and speed calculator that calculates a distance and a speed of the target on the basis of the beat frequency, for each of the chirps, of the target which is determined to be an identical target by the identical target determinator.

Advantages of the Invention

Because the radar device in accordance with the present invention is constructed as above, the radar device can carry out the tracking process for each chirp by using the beat frequency to calculate distance and speed estimated values and pairs the beat frequency associated with an up-chirp and that associated with a down-chirp with each other by using the above-mentioned distance and speed estimated values, thereby being able to improve the accuracy of estimating the distance and the accuracy of estimating the speed.

EMBODIMENTS OF THE INVENTION

Hereafter, in order to explain this invention in greater detail, the preferred embodiments of the present invention will be described with reference to the accompanying drawings.

Embodiment 1

Figure 1:
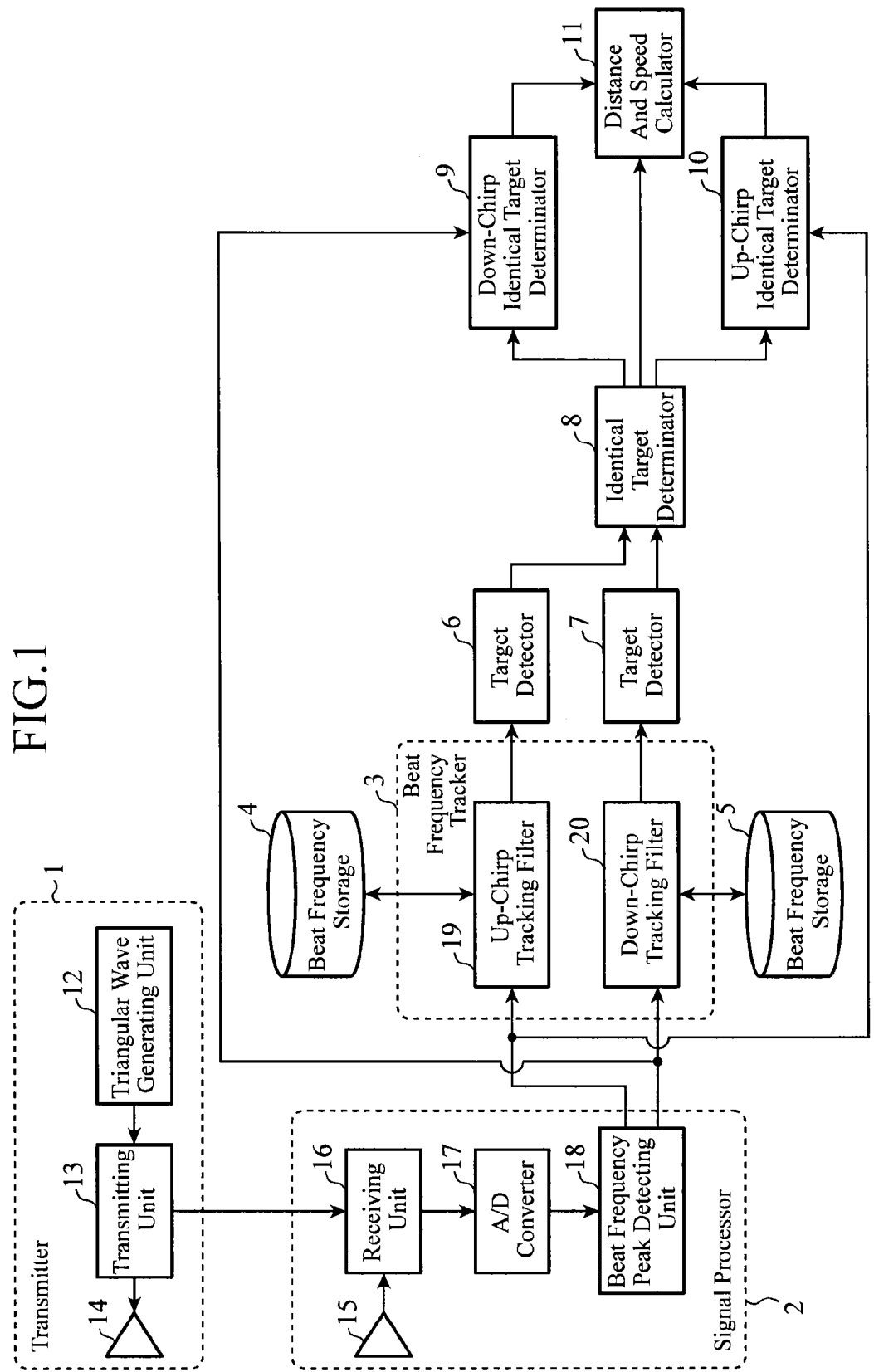
FIG. 1 is a diagram showing the structure of a radar device in accordance with Embodiment 1 of the present invention.

FIG. 1 is a diagram showing the structure of a radar device in accordance with Embodiment 1 of the present invention. The radar device is comprised of a transmitter 1, a signal processor 2, a beat frequency tracker 3, beat frequency storages 4 and 5, target detectors 6 and 7, an identical target determinator 8, a down-chirp identical target determinator 9, an up-chirp identical target determinator 10, and a distance and speed calculator 11, as shown in FIG. 1.

The transmitter 1 generates a transmission signal whose frequency increases or decreases linearly and periodically by a fixed modulation width, and transmits, as a radar wave, the transmission signal to outside the radar device. This transmitter 1 has a triangular wave generating unit 12, a transmitting unit 13, and a transmitting antenna 14.

The triangular wave generating unit 12 generates a modulation signal having a predetermined triangular shape. The modulation signal generated by this triangular wave generating unit 12 is outputted to the transmitting unit 13. The transmitting unit 13 transmits, as a radar wave, the transmission signal which is frequency-modulated according to the modulation signal from the triangular wave generating unit 12 via the transmitting antenna 14. The transmitting unit 13 also outputs the transmission signal directly to the signal processor 2.

The signal processor 2 receives a reflected wave generated by reflection of the radar wave from the transmitter 1 from a reflecting object (target), generates a received signal, and specifies a beat frequency for each chirp on the basis of the received signal and the transmission signal directly acquired from the transmission signal 1. This signal processor 2 has a receiving antenna 15, a receiving unit 16, an A/D converter 17, and a beat frequency peak detecting unit 18.

The receiving unit 16 receives a reflected wave from a target via the receiving antenna 15, generates a received signal, and mixes this received signal with the transmission signal directly received from the transmitter 1 to generate a beat signal having an intermediate frequency. The beat signal generated by this receiving unit 16 is outputted to the A/D converter 17. The A/D converter 17 converts the beat signal from the receiving unit 16 into a digital signal. The beat signal which is converted into the digital signal by this A/D converter 17 is outputted to the beat frequency peak detecting unit 18.

The beat frequency peak detecting unit 18 carries out a frequency analysis using FFT (Fast Fourier Transform) or the like on the basis of the beat signal from the A/D converter 17 to extract a beat frequency for each chirp. The time that the beat frequency (referred to as the beat frequency observation time from here on) is acquired is added to the beat frequency. Data showing the beat frequency associated with an up-chirp, which is extracted by this beat frequency peak detecting unit 18, is outputted to an up-chirp tracking filter 19 which will be mentioned below while data showing the beat frequency associated with a down-chirp is outputted to a down-chirp tracking filter 20 which will be mentioned below.

The beat frequency tracker 3 carries out tracking processes on the basis of the data showing the beat frequency associated with each chirp from the signal processor 2 respectively to acquire beat frequencies of a target for each chirp. This beat frequency tracker 3 has the up-chirp tracking filter 19 and the down-chirp tracking filter 20.

The up-chirp tracking filter 19 carries out a tracking process on the basis of the data showing the beat frequency (frequency peaks) associated with an up-chirp from the signal processor 2 to acquire a frequency peak having a correlation among plural sampled up-chirps as a beat frequency of a target. Data showing the beat frequency of the target acquired by this up-chirp tracking filter 19 is outputted to the beat frequency storage 4. The up-chirp tracking filter 19 also extracts beat frequency time series data stored in the beat frequency storage 4, and outputs the beat frequency time series data to the target detector 6. The down-chirp tracking filter 20 carries out a tracking process on the basis of the data showing the beat frequency (frequency peaks) associated with a down-chirp from the signal processor 2 to acquire a frequency peak having a correlation among plural sampled down-chirps as a beat frequency of a target. Data showing the beat frequency of the target acquired by this down-chirp tracking filter 20 is outputted to the beat frequency storage 5. The down-chirp tracking filter 20 also extracts beat frequency time series data stored in the beat frequency storage 5, and outputs the beat frequency time series data to the target detector 7. The structure of the up-chirp tracking filter 19 and that of the down-chirp tracking filter 20 will be mentioned below.

The beat frequency storage 4 stores the data showing the beat frequency of the target from the up-chirp tracking filter 19 in a time series. Further, the beat frequency time series data stored in the beat frequency storage 4 are extracted by the up-chirp tracking filter 19. The beat frequency storage 5 stores the data showing the beat frequency of the target from the down-chirp tracking filter 20 in a time series. Further, the beat frequency time series data stored in the beat frequency storage 5 are extracted by the down-chirp tracking filter 20.

The target detector 6 calculates distance and speed estimated values of the target on the basis of the beat frequency time series data associated with up-chirps from the up-chirp tracking filter 19. Data showing the distance and speed estimated values of the target calculated by this target detector 6 are outputted to the identical target determinator 8. The target detector 7 calculates distance and speed estimated values of the target on the basis of the beat frequency time series data associated with down-chirps from the down-chirp tracking filter 20. Data showing the distance and speed estimated values of the target calculated by this target detector 7 are outputted to the identical target determinator 8.

The identical target determinator 8 determines whether or not the target detected for each chirp is an identical target on the basis of the data showing the distance and speed estimated values of the target for each chirp from the target detectors 6 and 7 (whether or not pairing of the beat frequencies is established). Data showing the result of the determination (the beat frequencies which are paired with each other) acquired by this identical target determinator 8 is outputted to the down-chirp identical target determinator 9, the up-chirp identical target determinator 10, and the distance and speed calculator 11.

The down-chirp identical target determinator 9 converts the distance and speed estimated values of a target which is included in the targets handled by the target detector 6 and which is determined to be not an identical target by the identical target determinator 8 (no pairing of the beat frequencies is established) into a beat frequency estimated value associated with a down-chirp, and carries out identical target determination with respect to the beat frequency associated with a down-chirp (calculates a correlation with the beat frequency associated with a down-chirp from the signal processor 2 to carryout pairing of the beat frequencies). Data showing the result of the determination by this down-chirp identical target determinator 9 (the beat frequencies which are paired with each other) is outputted to the distance and speed calculator 11.

The up-chirp identical target determinator 10 converts the distance and speed estimated values of a target which is included in the targets handled by the target detector 6 and which is determined to be not an identical target by the identical target determinator 8 (no pairing of the beat frequencies is established) into a beat frequency estimated value associated with an up-chirp, and carries out identical target determination with respect to the beat frequency associated with an up-chirp (calculates a correlation with the beat frequency associated with an up-chirp from the signal processor 2 to carry out pairing of the beat frequencies). Data showing the result of the determination by this up-chirp identical target determinator 10 (the beat frequencies which are paired with each other) is outputted to the distance and speed calculator 11.

The distance and speed calculator 11 calculates the distance and the speed of the target on the basis of the data showing the beat frequencies which are paired with each other from the identical target determinator 8, the down-chirp identical target determinator 9, and the up-chirp identical target determinator 10.

Next, the structure of the up-chirp tracking filter 19 and that of the down-chirp tracking filter 20 will be explained by using FIG. 2.

Although only the structure of the up-chirp tracking filter 19 will be explained and illustrated hereafter, the structure of the down-chirp tracking filter 20 is the same as that of the up-chirp tracking filter 19. The up-chirp tracking filter 19 is comprised of a correlation unit 191, an initializing unit 192, a smoothing unit 193, and a predicting unit 194, as shown in FIG. 2.

The correlation unit 191 carries out a correlation process of calculating a correlation with a predicted beat frequency of a temporary target from the predicting unit 194 on the data showing the beat frequency from the beat frequency peak detecting unit 18. When assuming that no correlation is established between them, the correlation unit 191 then outputs the data showing the beat frequency to the initializing unit 192. In contrast, when assuming that a correlation is established between them, the correlation unit 191 outputs the data showing the beat frequency to the smoothing unit 193. The correlation unit 191 further outputs the data showing the beat frequency which the correlation unit assumes has a correlation to the beat frequency storage 4, and stores the data in a time series. The beat frequency time series data stored in the beat frequency storage 4 are then extracted by the up-chirp tracking filter 19 and are outputted to the target detector 6.

The initializing unit 192 sets up initial smoothed values (beat frequency and beat frequency rate of change estimated values) of a new temporary target on the basis of the beat frequency which the correlation unit 191 determines does not have a correlation. The time that the beat frequency is acquired is added to the smoothed values set up by the initializing unit 192. Data showing the smoothed values of the temporary target set up by this initializing unit 192 are outputted to the predicting unit 194.

The smoothing unit 193 updates the smoothed values (the beat frequency and beat frequency rate of change estimated values) of the temporary target on the basis of the beat frequency which the correlation unit 191 determines has a correlation. The time that the beat frequency is updated is added to the smoothed values of the temporary target updated by the smoothing unit 193. Data showing the smoothed values of the temporary target updated by this smoothing unit 193 are outputted to the predicting unit 194 and the target detector 6. Although an output of the data showing the smoothed values (the beat frequency and beat frequency rate of change estimated values) from the smoothing unit 193 to the target detector 6 is described in FIG. 2, this output is not performed in Embodiment 1.

The predicting unit 194 calculates the predicted beat frequency of the temporary target on the basis of both the data showing the beat frequency observation time from the beat frequency peak detecting unit 18 and the data showing the smoothed values of the temporary target from the initializing unit 192 or the smoothing unit 193. Data showing the predicted beat frequency calculated by this predicting unit 194 is outputted to the correlation unit 191.

Figure 3:
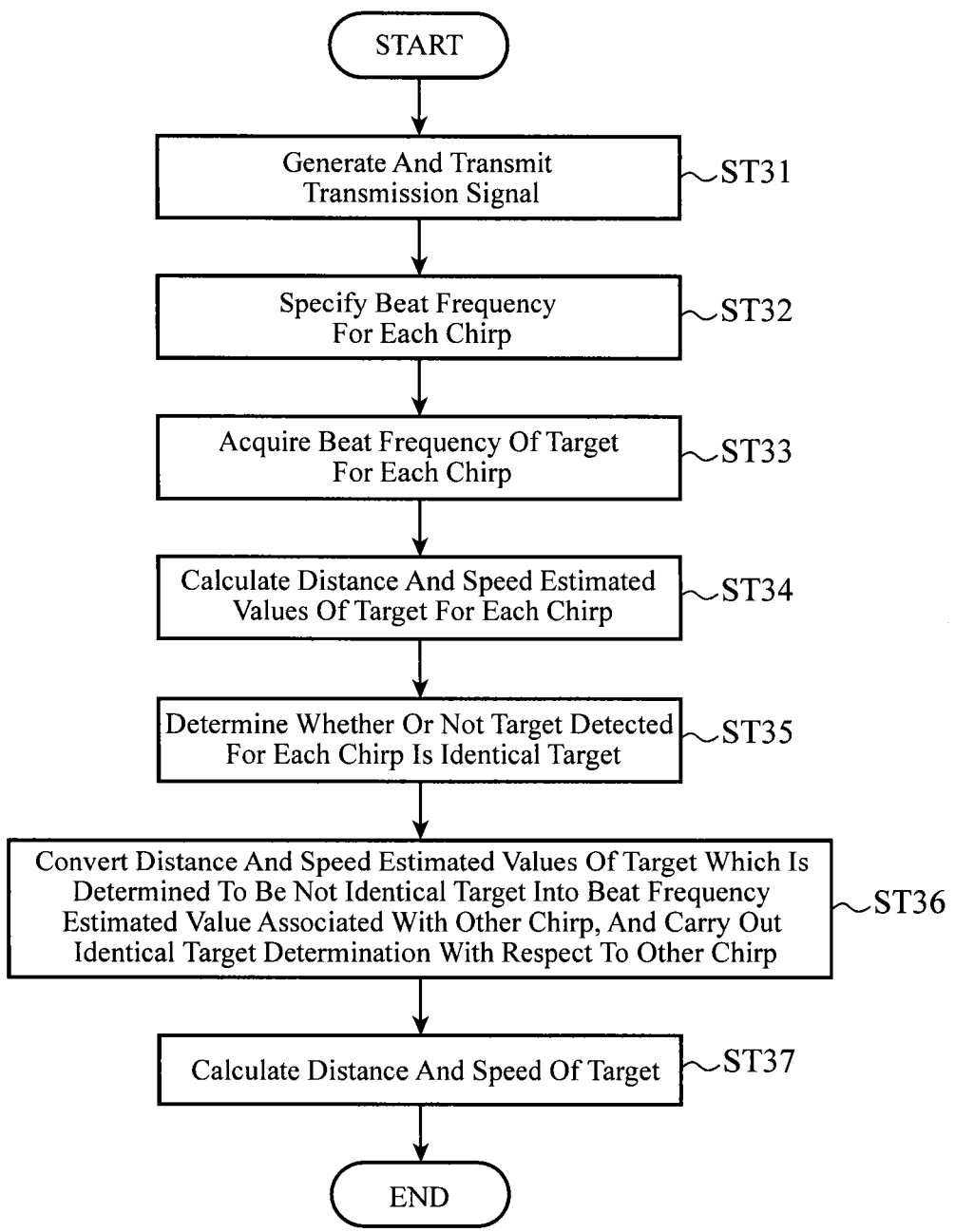
FIG. 3 is a flow chart showing the operation of the radar device in accordance with Embodiment 1 of the present invention.

Next, the operation of the radar device constructed as above will be explained with reference to FIG. 3. In the operation of the radar device, the transmitter 1 generates a transmission signal and transmits the transmission signal as a radar wave first, as shown in FIG. 3 (step ST31). More specifically, the triangular wave generating unit 12 generates a modulation signal having a predetermined triangular shape first. The transmitting unit 13 then transmits, as a laser wave, the transmission signal which is frequency-modulated according to the modulation signal via the transmitting antenna 14. The transmitting unit 13 outputs the transmission signal directly to the signal processor 2.

The signal processor 2 then specifies a beat frequency for each chirp on the basis of a received signal which the radar device generates by receiving a reflected wave generated by reflection of the radar wave from the transmitter 1 from a target, and the transmission signal acquired directly from the transmission signal 1 (step ST32). More specifically, the receiving unit 16 receives a reflected wave from a target via the receiving antenna 15 and generates a received signal, and also mixes this received signal with the transmission signal directly received from the transmitter 1 to generate a beat signal having an intermediate frequency, and the A/D converter 17 converts this beat signal into a digital signal. The beat frequency peak detecting unit 18 then carries out a frequency analysis by using an FFT or the like on the basis of the beat signal converted into a digital signal to extract a beat frequency $f_t^u(i)$ associated with an up-chirp and a beat frequency $f_t^d(j)$ associated with a down-chirp. In the expressions, i and j show the number of peaks extracted by the beat frequency peak detecting unit 19, and t shows the beat frequency observation time. Further, u shows that the chirp is an up-chirp, and d shows that the chirp is a down-chirp.

The beat frequency tracker 3 then carries out tracking processes on the basis of the data showing the beat frequency associated with each chirp from the signal processor 2 respectively to acquire beat frequencies of a target for each chirp (step ST33). Hereafter, the details of the process carried out by the up-chirp tracking filter 19 will be explained.

This up-chirp tracking filter 19 carries out the process according to equations (5) to (26) which will be shown below. A state vector having a temporary target number m (m=1, 2, . . . , M) which is used by the up-chirp tracking filter 19 is defined by the equation (5), and a motion model of the state vector is defined by the equation (6). In the equation (5), a subscript k shows a sampling number, and m in ( ) shows a target number. Further, $\dot{f}_k^u$ shows a frequency rate of change of an up-chirp. Further, $Q_k$ in the equation (8) shows a driving noise covariance matrix. In addition, an observation matrix is defined by the equation (10), and an observation model is defined by the equation (9). $A_k$ in the equation (11) shows an observation error variance of the beat frequency.

In the up-chirp tracking filter 19, the correlation unit 191 carries out a correlation process of calculating a correlation with the predicted beat frequency of a temporary target from the predicting unit 194 on the beat frequency associated with an up-chirp from the peak detecting unit 18 first by using the equation (12). In the equation (12), $f_{k|k-1}^u(m)$ shows the predicted beat frequency of the temporary target acquired by the predicting unit 194.

At this time, when determining that no temporary target for which the beat frequency satisfies the inequality given by the equation (12) exists, the correlation unit 191 assumes that the beat frequency does not have a correlation, and the initializing unit 192 sets up the smoothed values of a new temporary target on the basis of the beat frequency. As a method of setting up the smoothed values, as shown in the equation (15) and (16), the beat frequency and an observation error covariance matrix are set as a smoothed vector initial value and a smoothed error covariance matrix initial value respectively, and the time added to the beat frequency is set. In this case, for example, $A_0$ is set as the beat frequency observation error variance at the initial time, and $v_{max}$ is set as a maximum of the beat frequency rate of change. In addition, as shown in the equation (17), 0 is set as a track quality TQ value for the new temporary target, and the total number M of temporary targets is incremented by one. Further, when no beat frequency having a correlation with that of a registered temporary target m is acquired, a process is carried out as a memory track, as shown in the equations (22) and (23), and the TQ value is decremented by one (equation (24)). At this time, when the TQ value is less than a preset lower limit TQmin, the TQ value is fixed to TQmin.

In contrast, when determining that a temporary target for which the beat frequency satisfies the inequality given by the equation (12) exists, the correlation unit 191 assumes that the beat frequency has a correlation, and the smoothing unit 193 carries out an update of the state of the temporary target m according to the equations (18) to (20) by defining the beat frequency as a vector of observed values of the temporary target m with which a correlation is established. In addition, the track quality TQ value for the temporary target m is incremented by one. At this time, when the TQ value exceeds a preset upper limit TQmax, the TQ value is fixed to TQmax. In this case, $S_k^u(m)$ shows a remainder covariance matrix of the temporary target m, $P_{k|k-1}^u(m)$ shows a prediction error covariance matrix of the temporary target m, $P_{k|k}^u(m)$ shows a smoothed error covariance matrix of the temporary target m, and $K_k^u$ shows a gain matrix of the temporary target m. Further, in order for the target detector 6 to calculate the distance and speed estimated values of a target, data showing the beat frequency with which a correlation is established is stored in the beat frequency storage 4 in a time series.

For the smoothed values which are acquired by the initializing unit 192 or the smoothing unit 193 the above-mentioned way, the predicting unit 194 then calculates the difference $\Delta t$ between the acquisition time or the update time added to the smoothed values, and the beat frequency observation time newly furnished thereto by the beat frequency peak detecting unit 18, and, after calculating a state transition matrix given by the equation (7), calculates the predicted beat frequency, as well as a quantity of state, at the beat frequency observation time according to the equations (25) and (26).

$$x_k^u(m) = [f_k^u \ \dot{f}_k^u]^T \tag{5}$$

$$x_{k+1}^u = \Phi_k x_k^u + w_k \tag{6}$$

$$\Phi_k = \begin{bmatrix} 1 & \Delta t \\ 0 & 1 \end{bmatrix} \tag{7}$$

$$E[w_k] = 0, \quad E[w_k w_k^T] = Q_k \tag{8}$$

$$f_k^u = H x_k^u + v_k \tag{9}$$

$$H = [1 \ 0] \tag{10}$$

$$E[v_k] = 0, \quad E[v_k v_k^T] = A_k \tag{11}$$

$$(f_k^u(i) - f_{k|k-1}^u(m))^T S_k^u(m)^{-1} (f_k^u(i) - f_{k|k-1}^u(m)) \leq d \tag{12}$$

$$S_k^u(m) = H P_{k|k-1}^u(m) H^T + A_k \tag{13}$$

$$f_{k|k-1}^u(m) = H \tilde{x}_{k|k-1}^u(m) \tag{14}$$

$$x_0^u(m) = [f_0^u \ 0]^T \tag{15}$$

$$P_0^u(m) = \begin{bmatrix} A_0 & 0 \\ 0 & v_{max}^2 \end{bmatrix} \tag{16}$$

$$TQ(m) = 0 \tag{17}$$

$$\hat{x}_{k|k}^u(m) = \tilde{x}_{k|k-1}^u(m) + K_k^u[f_k^u - H\tilde{x}_{k|k-1}^u(m)] \tag{18}$$

$$P_{k|k}^u(m) = [I - K_k^u H] P_{k|k-1}^u(m) \tag{19}$$

$$K_k^u = P_{k|k-1}^u(m) H^T S_k^u(m)^{-1} \tag{20}$$

$$TQ(m) = \min\{TQ(m) + 1, TQ_{max}\} \tag{21}$$

$$\hat{x}_{k|k}^u(m) = \tilde{x}_{k|k-1}^u(m) \tag{22}$$

$$P_{k|k}^u(m) = P_{k|k-1}^u(m) \tag{23}$$

$$TQ(m) = \max\{TQ(m) - 1, TQ_{min}\} \tag{24}$$

$$\tilde{x}_{k+1|k}^u = \Phi_k \hat{x}_{k|k}^u \tag{25}$$

$$P_{k+1|k}^u = \Phi_k^T P_{k|k}^u \Phi_k + Q_k \tag{26}$$

Although the case in which the up-chirp tracking filter 19 carries out the process by using the equations (5) to (26) is shown above, and, when the angle and the signal power can be used simultaneously together with the beat frequency, these parameters can be added to the state vector to extend the capabilities of the radar device. Further, although the example in which a Kalman filter is used as the tracking process is shown above, another tracking filter, such as an α-β (–γ) filter, can be alternatively used. In addition, although the case in which the beat frequency and the beat frequency rate of change (the first-order time derivative of the beat frequency) are defined as the state vector of the tracking filter assuming that the motion model of each target is a fixed speed model in the equation (5) is shown, the state vector can be defined to additionally include the second-order time derivative of the beat frequency assuming that the motion model of each target is a non-fixed speed model. Further, the down-chirp tracking filter 20 carries out the same process as that carried out by the above-mentioned up-chirp tracking filter 19. At this time, the superscript u in the state vector shown in the equations (5) to (26) is changed to d.

The target detector 6 then carries out target detection determination from the TQ value of the beat frequency, as a temporary target, on which the tracking process is carried out on the basis of the signal from the up-chirp tracking filter 19, and calculates the distance and speed estimated values of the target on the basis of the beat frequency time series data which are acquired by the up-chirp tracking filter 19 and which have a correlation with that of the temporary target m (step ST34). Hereafter, the details of the process carried out by the target detector 6 will be explained. The target detector 6 carries out the process according to equations (27) to (34) which will be shown below.

The target detector 6 receives the TQ value of the temporary target m (m=1, 2, ..., M) first, and, when the TQ value exceeds TQthre (threshold) predetermined, determines that it has detected a target. A temporary target which the target detector determines is the one which it has detected is referred to as a detected target. Because the tracking process is carried out on the detected target by the up-chirp tracking filter 19, the beat frequency time series data at the time of up-chirps with which a correlation is established, i.e., a set of beat frequencies at different sampling times can be acquired.

At this time, the beat frequency at the time of an up-chirp at an arbitrary time (k=1, 2, 3, ..., K) can be described by the equation (27). The left side of the equation (27) shows the beat frequency at the time of an up-chirp at a sampling time tk, and m in ( ) shows the target number. Further, the first term R in the right side shows the distance to the target of the target number m at the sampling time tk, and the second term shows the rate of change (referred to as the speed from here on) of the target of the target number m at the sampling time tk.

In order to calculate the distance and the speed of the target of the target number m from the beat frequency time series data, the target detector 6 defines the distance and the speed of the target at a reference sampling time to, as shown in the equation (28), and models the distance and the speed of the target at an arbitrary sampling time, as shown in the equation (29). Therefore, because a state transition matrix can be defined by the time difference delta between the reference time t0 and an arbitrary sampling time, as shown in the equation (31), the beat frequency at the time of an up-chirp at an arbitrary time described in the equation (27) can be expressed by the distance and the speed at the reference time. Therefore, the distance and the speed of the target at the reference time can be calculated by using the simultaneous equations. Further, the distance and speed estimated values at an arbitrary sampling time can be acquired from the equations (30) to (32). For example, when at least two samples of beat frequency time series data are stored, the distance and speed estimated values of the target at the reference time can be calculated by using the simultaneous equations (33) and (34).

$$f_k^u(m) = \frac{2B}{cT} R_k^u(m) + \frac{f_0}{c} 2\dot{R}_k^u(m) \qquad (27)$$

$$y_0^u = \begin{bmatrix} R_0^u & \dot{R}_0^u \end{bmatrix}^T \qquad (28)$$

$$y_k^u = \begin{bmatrix} R_k^u & \dot{R}_k^u \end{bmatrix}^T \qquad (29)$$

$$y_k^u = \Psi_k y_0^u \qquad (30)$$

$$\Psi_k = \begin{bmatrix} 1 & \Delta \\ 0 & 1 \end{bmatrix} \qquad (31)$$

$$\Delta = t_k - t_0 \qquad (32)$$

-continued $$f_0^u(m) = \frac{2B}{cT} R_0^u(m) + \frac{f_0}{c} 2\dot{R}_0^u(m) \qquad (33)$$

$$f_k^u(m) = \frac{2B}{cT} \left( R_0^u(m) + \Delta \cdot \dot{R}_0^u(m) \right) + \frac{f_0}{c} 2\dot{R}_0^u(m) \qquad (34)$$

Further, the target detector 7 carries out the target detection determination from the TQ value of the beat frequency, as a temporary target, on which the tracking process is carried out on the basis of the signal from the down-chirp tracking filter 20, and calculates the distance and speed estimated values of the target on the basis of the beat frequency time series data at the time of an up-chirp which have a correlation with that of the temporary target m acquired by the down-chirp tracking filter 20. At this time, the superscript u in the state vector shown in the equations (27) to (34) is changed to d. Further, a negative sign (−) is added to the second term in the right side of the equation (27). In this case, when the reference time at which the distance and the speed of the target are to be calculated in the target detector 6 is made to match that in the target detector 7, the distance and speed estimated values of the target at the same reference time can be calculated.

The identical target determinator 8 then determines whether or not the target detected for each of the chirps is an identical target on the basis of the data showing the distance and speed estimated values of the target associated with each of the chirps from the target detectors 6 and 7 (step ST35). The identical target determinator 8 carries out the process according to equations (35) to (43) which will be shown below, and so on.

In this case, as a criterion by which to determine whether or not the target detected for each of the chirps is an identical target, whether the difference between the distance and speed estimated values of the target m which are acquired for the up-chirp, and the distance and speed estimated values of the target m which are acquired for the down-chirp falls within a fixed range is used, and it is determined that they are an identical target when the criterion is satisfied. In an example of a method of determining whether or not the target detected for each of the chirps is an identical target, for example, when the equations (35) and (36) are established simultaneously or when an inequality, such as the equation (37), is satisfied, it is determined that they are an identical target. In the equations, $\sigma_R$ shows the accuracy of estimating the distance, $\sigma_{\dot{R}}$ shows the accuracy of estimating the speed, and ThR, ThV and ThRV show thresholds.

When there exist two or more pairs simultaneously satisfying either the equations (35) and (36) or the equation (37), the identical target determinator 8 selects a pair which minimizes either evaluated values given by the equations (35) and (36) or an evaluated value given by the equation (37), and outputs the pair of the beat frequency associated with an up-chirp and the beat frequency associated with a down-chirp. When an angle measurement value is added to each beat frequency, a pair which satisfies the equations (35), (36), and (38) simultaneously is outputted. As an alternative, a pair which satisfies the equation (39) can be outputted. In the equations, $\sigma_\theta$ shows the accuracy of observation of angle measurement, and ThRVθ shows a threshold. Further, there is also a method using a chi-squared test as the method of determining whether or not the target detected for each of the chirps is an identical target. For example, it is determined that there is a possibility that the target detected for each of the chirps is an identical target when the equation (40) is established. d in the right side of the equation (40) is determined from a chi square distribution table having a degree of freedom of 2.

As mentioned above, two or more pairs can exist and redundancy can occur in the allocation. Therefore, a correlation matrix is generated as shown in the equation (41). In the correlation matrix, each row element shows a detected target number associated with an up-chirp. On the other hand, each column element shows a detected target number associated with a down-chirp. 1 is inserted into each of row and column elements corresponding to a pair of an up-chirp and a down-chirp which satisfies the equation (41). 0 is set to each of row and column elements corresponding to a pair not satisfying the equation, and an optimal pair is selected. For example, it is assumed that two targets exist for an up-chirp and two targets exist for a down-chirp, and, as results acquired using the determination equation (40), a correlation matrix given by the equation (42) is generated. From the equation (42), a pair as shown in the equation (43) is assumed as a pair of a detected target associated with an up-chirp and a detected target associated with a down-chirp. These show two types of assumptions as will be shown below.

Assumption 1: "detected target 1 associated with up-chirp, and detected target 1 associated with down-chirp", and "detected target 2 associated with up-chirp and detected target 2 associated with down-chirp"

Assumption 2: "detected target 2 associated with up-chirp, and detected target 1 associated with down-chirp"

In addition, the best assumption is selected from among the assumptions regarding each pair expressed by the equation (43). For example, a pair which minimizes the sum total of the results acquired using the equation (40) is selected.

$$|R^u(m) - R^d(n)| \leq ThR \tag{35}$$

$$|\dot{R}^u(m) - \dot{R}^d(n)| \leq ThV \tag{36}$$

$$\frac{(R^u(m) - R^d(n))^2}{\sigma_R^2} + \frac{(\dot{R}^u(m) - \dot{R}^d(n))^2}{\sigma_{\dot{R}}^2} \leq ThRV \tag{37}$$

$$|\theta^u(m) - \theta^d(n)| \leq Th\theta \tag{38}$$

$$\frac{(R^u(m) - R^d(n))^2}{\sigma_R^2} + \frac{(\dot{R}^u(m) - \dot{R}^d(n))^2}{\sigma_{\dot{R}}^2} + \frac{(\theta^u(m) - \theta^d(n))^2}{\sigma_\theta^2} \leq ThRV\theta \tag{39}$$

$$\frac{(R^u(m) - R^d(n))^2}{\sigma_R^2} + \frac{(\dot{R}^u(m) - \dot{R}^d(n))^2}{\sigma_{\dot{R}}^2} \leq d \tag{40}$$

$$\Omega(X) = W_{ij}(i = 1, 2, \ldots, I; j = 1, 2, \ldots, J) = \begin{bmatrix} W_{11} & W_{12} & W_{13} & \ldots & W_{1J} \\ W_{21} & W_{22} & W_{23} & \ldots & W_{2J} \\ W_{31} & W_{32} & W_{33} & \ldots & W_{3J} \\ \vdots & \vdots & \vdots & \vdots & \vdots \\ W_{I1} & W_{I2} & W_{I3} & \ldots & W_{IJ} \end{bmatrix} \tag{41}$$

$$\Omega(X) = W_{ij}(i = 1, 2; j = 1, 2) = \begin{bmatrix} 1 & 0 \\ 1 & 1 \end{bmatrix} \tag{42}$$

$$\Omega(X^1) = \begin{bmatrix} 1 & 0 \\ 0 & 1 \end{bmatrix}, \Omega(X^2) = \begin{bmatrix} 0 & 0 \\ 1 & 0 \end{bmatrix} \tag{43}$$

The down-chirp identical target determinator 9 then converts the distance and speed estimated values of a target which is included in the targets handled by the target detector 6 and which is determined to be not an identical target by the identical target determinator 8 into a beat frequency estimated value associated with a down-chirp, and carries out identical target determination with respect to the beat frequency associated with a down-chirp (step ST36). Hereafter, the details of the process carried out by the down-chirp identical target determinator 9 will be explained. The down-chirp identical target determinator 9 carries out the process according to equations (44) and (45) which will be shown below.

The down-chirp identical target determinator 9 converts the distance and speed estimated values into a beat frequency estimated value associated with a down-chirp by using the equation (44). When the equation (45) is established, the down-chirp identical target determinator determines that the target detected for each of the chirps is an identical target. In the equation, Thf means a threshold. When angle measurement information is added to each beat frequency, a determination equation, such as the equation (38) using an angle measurement value, can be added, like in the case of the identical target determinator 8. Further, when there exist two or more pairs satisfying the equation (45) in the down-chirp identical target determinator 9, the down-chirp identical target determinator selects a pair which minimizes an evaluated value given by the equation (45) and outputs the pair of the beat frequency associated with an up-chirp and the beat frequency associated with a down-chirp.

$$\hat{f}_k^d(m) = \frac{2B}{cT}\hat{R}_k^d(m) - \frac{f_0}{c}2\hat{\dot{R}}_k^d(m) \tag{44}$$

$$\left|\hat{f}_k^d(i) - \hat{f}_k^d(m)\right| \leq Thf \tag{45}$$

Further, the up-chirp identical target determinator 10 carries out the same process as that carried out by the above-mentioned down-chirp identical target determinator 9. At this time, the superscript d in the state vector shown in the equations (44) and (45) is changed to u.

The distance and speed calculator 11 then calculates the distance and the speed of the target on the basis of the data showing the beat frequencies which are paired with each other from the identical target determinator 8, the down-chirp identical target determinator 9, and the up-chirp identical target determinator 10 by using the equations (3) and (4) (step ST37).

As mentioned above, because the radar device in accordance with Embodiment 1 is constructed in such a way as to individually carry out the tracking process on a beat frequency acquired by using an up-chirp and the tracking process on a beat frequency acquired by using a down-chirp in a multitarget environment to calculate a correlation in a temporal direction, the radar device can provide a high correlation capability for targets without being affected by the influence of an offset causing a problem to arise in the time of performing conventional pairing between an up-chirp and a down-chirp. Because the radar device in accordance with Embodiment 1 is further constructed in such a way as to calculate distance and speed estimated values from beat frequency time series data correlated in each tracking process, and carry out pairing of the beat frequency associated with an up-chirp and the beat frequency associated with a down-chirp through the distance and speed estimated values, the occurrence of an incorrect pair can be suppressed.

In addition, the accuracy of estimating the distance and the accuracy of estimating the speed equivalent to those obtained by conventional pairing can be ensured.

Embodiment 2

Figure 4:
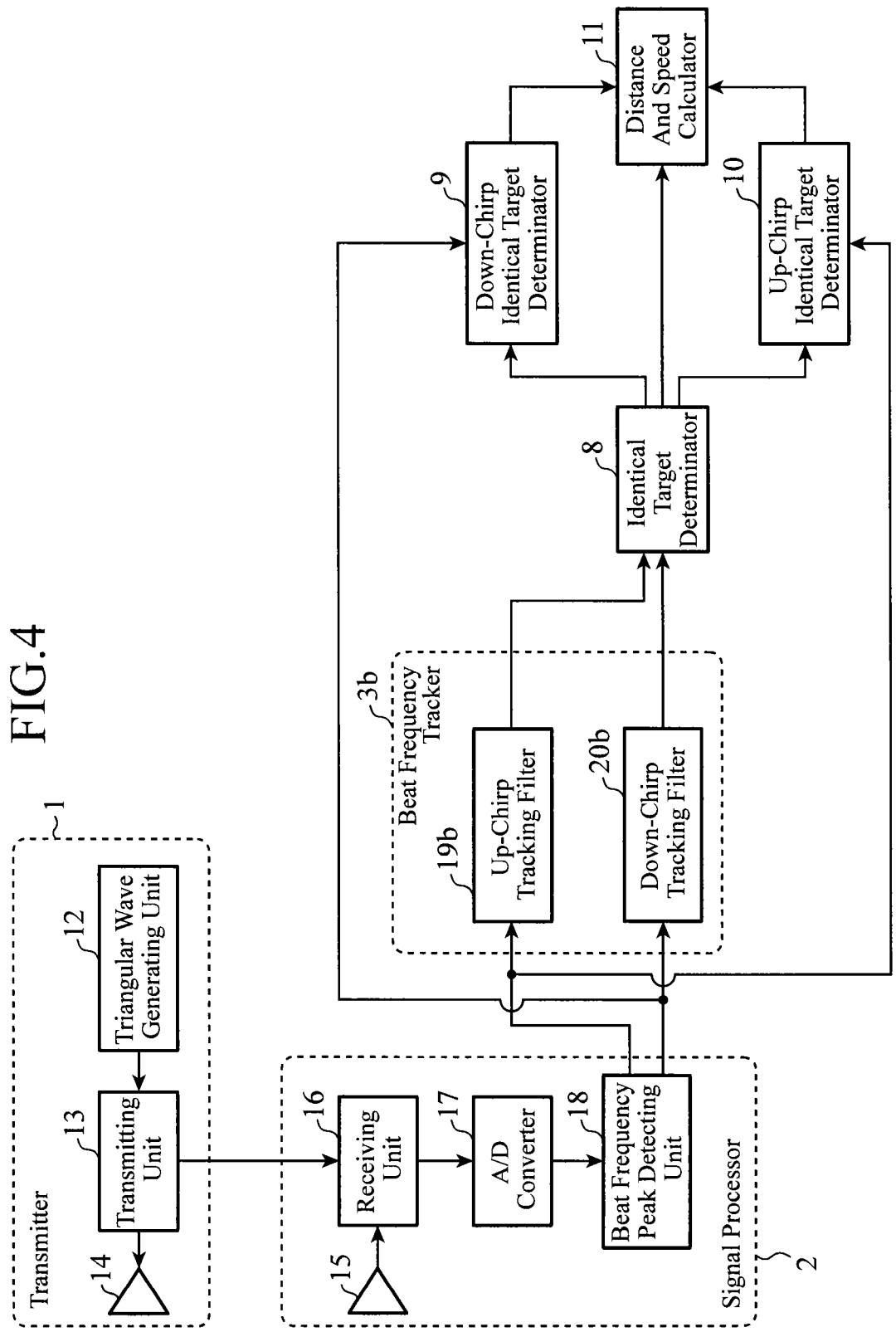
FIG. 4 is a diagram showing the structure of a radar device in accordance with Embodiment 2 of the present invention.

FIG. 4 is a diagram showing the structure of a radar device in accordance with Embodiment 2 of the present invention. In the radar device in accordance with Embodiment 2 shown in FIG. 4, the beat frequency storages 4 and 5 and the target detectors 6 and 7 of the radar device in accordance with Embodiment 1 which are shown in FIG. 1 are removed, and the beat frequency tracker 3 is replaced by a beat frequency tracker 3b. The other structural components are the same as those in accordance with Embodiment 1 and are designated by the same reference numerals, and the explanation of the components will be omitted hereafter.

The beat frequency tracker 3b carries out tracking processes on the basis of data showing a beat frequency associated with each chirp from a signal processor 2 respectively, and calculates distance and speed estimated values of a target on the basis of the beat frequency of the target acquired for each chirp. This beat frequency tracker 3b has an up-chirp tracking filter 19b and a down-chirp tracking filter 20b.

The up-chirp tracking filter 19b carries out a tracking process on the basis of the data showing the beat frequency (frequency peaks) associated with an up-chirp from the signal processor 2 to acquire a frequency peak having a correlation among plural sampled up-chirps as a beat frequency of a target, and calculates distance and speed estimated values of the target on the basis of the beat frequency. Data showing the beat frequency of the target acquired by this up-chirp tracking filter 19b and the calculated distance and speed estimated values of the target are outputted to an identical target determinator 8. The down-chirp tracking filter 20b carries out a tracking process on the basis of the data showing the beat frequency (frequency peaks) associated with a down-chirp from the signal processor 2 to acquire a frequency peak having a correlation among plural sampled down-chirps as a beat frequency of a target, and calculates distance and speed estimated values of the target on the basis of the beat frequency. Data showing the beat frequency of the target acquired by this down-chirp tracking filter 20b and the calculated distance and speed estimated values of the target are outputted to the identical target determinator 8.

Figure 5:
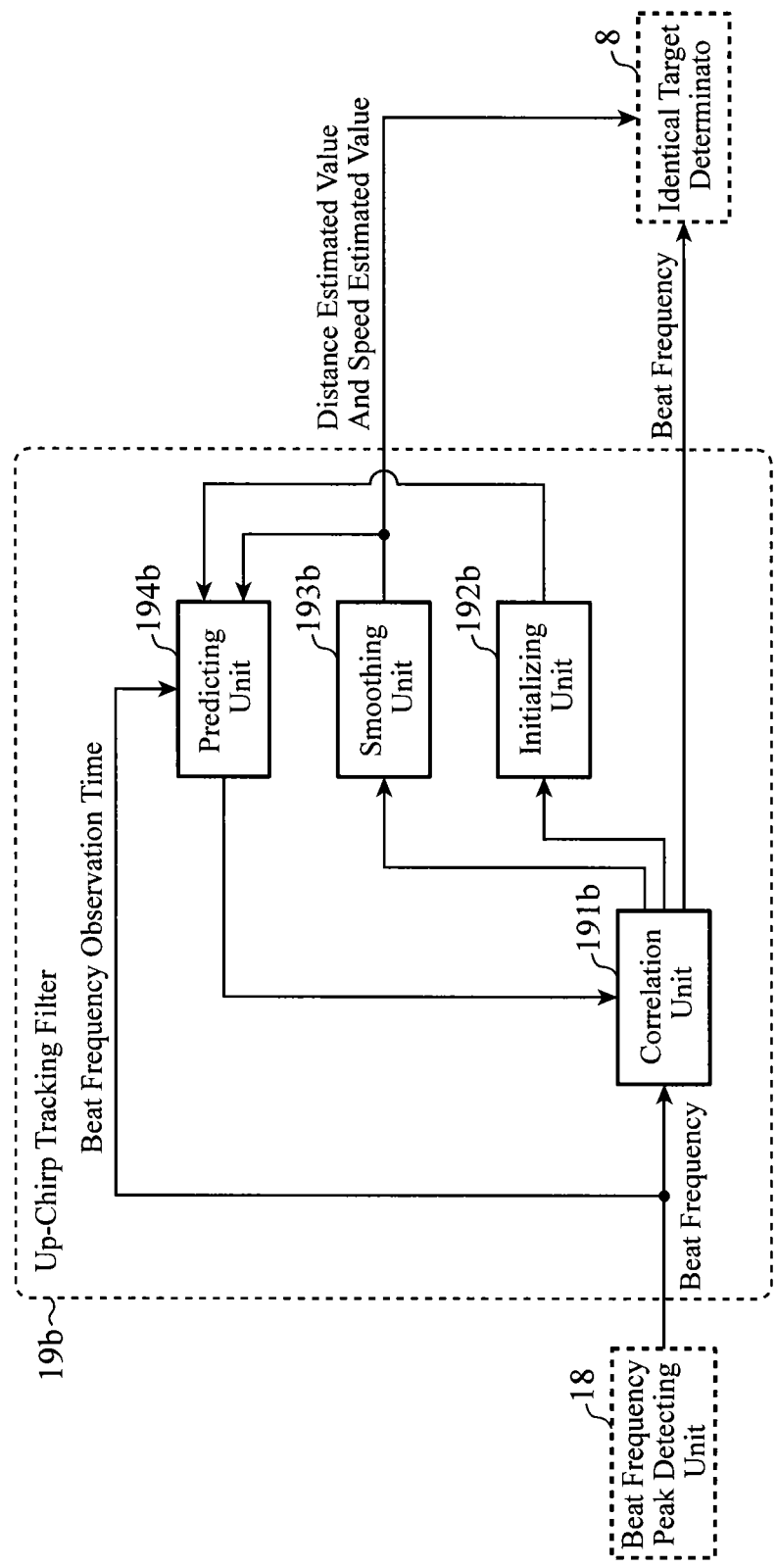
FIG. 5 is a diagram showing the structure of an up-chirp tracking filter in the radar device in accordance with Embodiment 2 of the present invention.

Next, the structure of the up-chirp tracking filter 19b and that of the down-chirp tracking filter 20b will be explained by using FIG. 5. Although only the structure of the up-chirp tracking filter 19b will be illustrated hereafter, the structure of the down-chirp tracking filter 20b is the same as that of the up-chirp tracking filter 19b. The up-chirp tracking filter 19b is comprised of a correlation unit 191b, an initializing unit 192b, a smoothing unit 193b, and a predicting unit 194b, as shown in FIG. 5.

The correlation unit 191b carries out a correlation process of calculating a correlation with a predicted beat frequency of a temporary target from the predicting unit 194b on data showing a beat frequency from a beat frequency peak detecting unit 18. When assuming that no correlation is established between them, the correlation unit 191b then outputs the data showing the beat frequency to the initializing unit 192b. In contrast, when assuming that a correlation is established between them, the correlation unit 191b outputs the data showing the beat frequency to the smoothing unit 193b. The correlation unit 191b also outputs data showing a value at the newest time of the beat frequency which is assumed to have a correlation to the identical target determinator 8.

The initializing unit 192b sets up initial smoothed values (distance and speed estimated values) of a beat frequency of a new temporary target on the basis of the beat frequency which the correlation unit 191b determines does not have a correlation. The time that the beat frequency is acquired is added to the smoothed values set up by the initializing unit 192b. Data showing the smoothed values of the temporary target set up by this initializing unit 192b are outputted to the predicting unit 194b.

The smoothing unit 193b updates the smoothed values (the distance and speed estimated values) of the temporary target on the basis of the beat frequency which the correlation unit 191b determines has a correlation. The time that the beat frequency is updated is added to the smoothed values of the temporary target updated by the smoothing unit 193b. Data showing the smoothed values of the temporary target updated by this smoothing unit 193b are outputted to the predicting unit 194b and the identical target determinator 8.

The predicting unit 194b calculates the predicted beat frequency of the temporary target on the basis of both data showing a beat frequency observation time from the beat frequency peak detecting unit 18 and the data showing the smoothed values of the temporary target from the initializing unit 192b or the smoothing unit 193b. Data showing the predicted beat frequency calculated by this predicting unit 194b is outputted to the correlation unit 191b.

The identical target determinator 8 determines whether or not the target detected for each chirp is an identical target on the basis of the data showing the distance and speed estimated values of the target associated with each chirp from the beat frequency tracker 3b.

Figure 6:
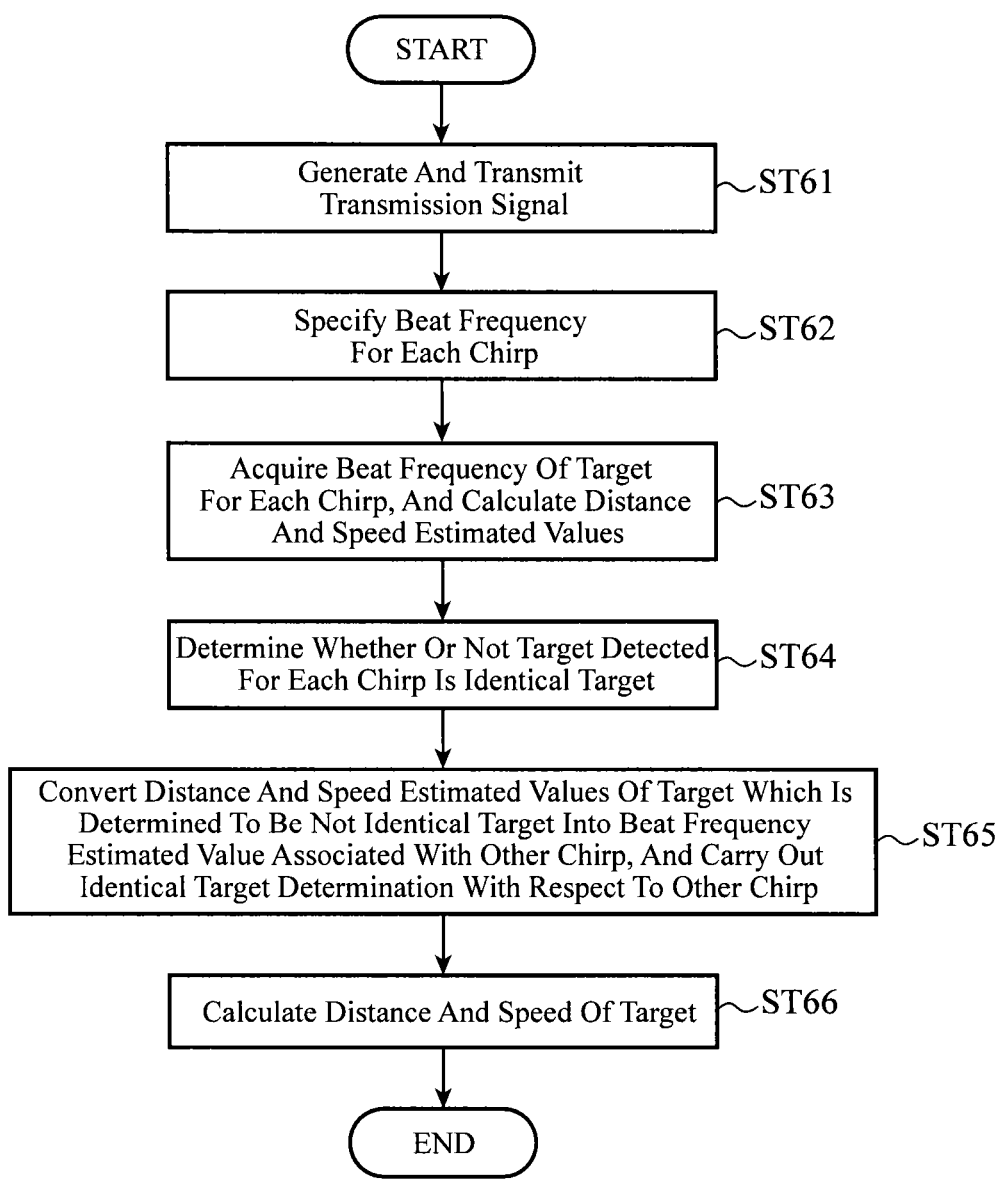
FIG. 6 is a flow chart showing the operation of the radar device in accordance with Embodiment 2 of the present invention.

Next, the operation of the radar device constructed as above will be explained with reference to FIG. 6. Hereafter, only a portion different from the operation of the radar device in accordance with Embodiment 1 will be explained. In the operation of the radar device, as shown in FIG. 6, the beat frequency tracker 3b, in step ST63, carries out tracking processes on the basis of data showing a beat frequency associated with each chirp from the signal processor 2 respectively, and calculates distance and speed estimated values of a target on the basis of the beat frequency of the target acquired for each chirp. Hereafter, the details of the process carried out by the up-chirp tracking filter 19b will be explained.

This up-chirp tracking filter 19b carries out the process fundamentally according to the equations (5) to (26), like the up-chirp tracking filter 19 in accordance with Embodiment 1. However, because there is only one different portion in the process, this portion will be shown hereafter. More specifically, a state vector having a temporary target number m (m=1, 2, ..., M) which is used by the up-chirp tracking filter 19a is defined by equation (46), and a motion model of the state vector is defined by the equation (6). $R_k^u$ shows the distance, and $\dot{R}_k^u$ shows the speed. In addition, an observation matrix is defined by equation (47), and an observation model is defined by the equation (9). In the down-chirp tracking filter 20b, an observation matrix is defined by equation (48).

In the up-chirp tracking filter 19b, the correlation unit 191b carries out a correlation process of calculating a correlation with a predicted beat frequency of a temporary target from the predicting unit 194b on the beat frequency associated with an up-chirp from the beat frequency peak detecting unit 18 first by using the equation (12). In this case, when determining that there exists a temporary target whose beat frequency satisfies an inequality given by the equation (12), the correlation unit 191b assumes that the beat frequency has a correlation.

In contrast, when determining that there exists no temporary target whose beat frequency satisfies the inequality given by the equation (12), the correlation unit 191*b* assumes that the beat frequency does not have a correlation. The initializing unit 192*b* sets up a new temporary target on the basis of the beat frequency. When the set-up new temporary target has a beat frequency having a correlation after the next scan, by solving the simultaneous equations (33) and (34) based on the premise that the speed is constant at a time when two or more scans of beat frequencies including the beat frequency of the new temporary target are stored, the radar device sets up a smooth vector initial value formed of a distance and a speed, as shown in the equation (49).

$$x_k^u(m) = \begin{bmatrix} R_k^u & \dot{R}_k^u \end{bmatrix}^T \tag{46}$$

$$H = \begin{bmatrix} \frac{2B}{cT} & \frac{2f_0}{c} \end{bmatrix} \tag{47}$$

$$H = \begin{bmatrix} \frac{2B}{cT} & -\frac{2f_0}{c} \end{bmatrix} \tag{48}$$

$$x_0^u(m) = \begin{bmatrix} R_0^u & \dot{R}_0^u \end{bmatrix}^T \tag{49}$$

Because the other processes are the same as those shown in Embodiment 1, the explanation of the processes will be omitted hereafter.

As mentioned above, because the radar device in accordance with Embodiment 2 is constructed in such a way as to calculate distance and speed estimated values of a target directly using the beat frequency acquired for each chirp, the radar device does not have to store beat frequency time series data, as compared with the radar device in accordance with Embodiment 1. Further, because the radar device does not have to have a function (target detectors 6 and 7) of calculating a distance and a speed after carrying out the beat frequency tracking process, the radar device can reduce the arithmetic load and the amount of memory.

Embodiment 3

Figure 7:
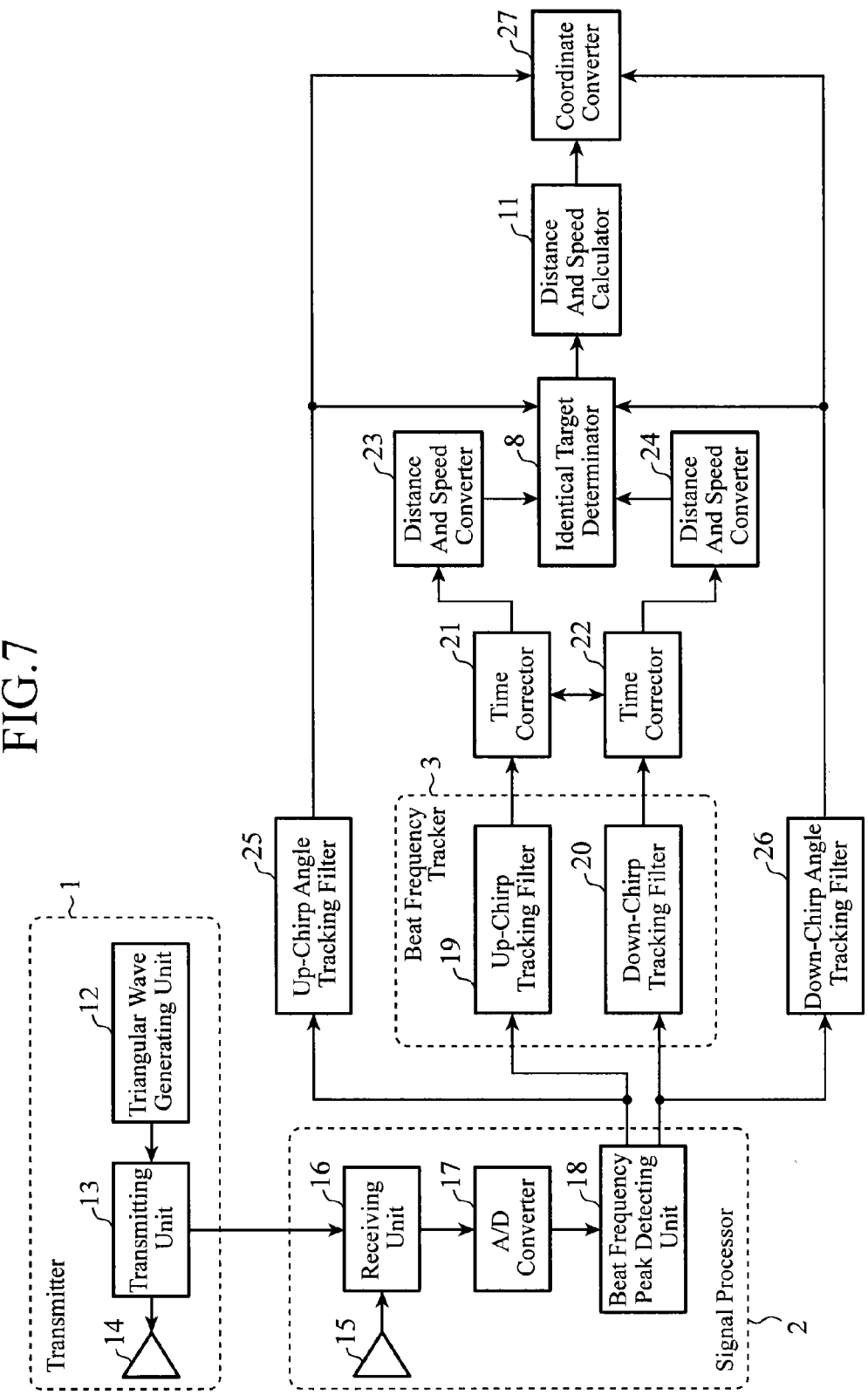
FIG. 7 is a diagram showing the structure of a radar device in accordance with Embodiment 3 of the present invention.

FIG. 7 is a diagram showing the structure of a radar device in accordance with Embodiment 3 of the present invention. In the radar device in accordance with Embodiment 3 shown in FIG. 7, the beat frequency storages 4 and 5, the target detectors 6 and 7, the down-chirp identical target determinator 9, and the up-chirp identical target determinator 10 of the radar device in accordance with Embodiment 1 which are shown in FIG. 1 are removed, and time correctors 21 and 22, distance and speed converters 23 and 24, an up-chirp angle tracking filter 25, a down-chirp angle tracking filter 26, and a coordinate converter 27 are additionally disposed. The other structural components are the same as those in accordance with Embodiment 1 and are designated by the same reference numerals, and the explanation of the components will be omitted hereafter.

Figure 2:
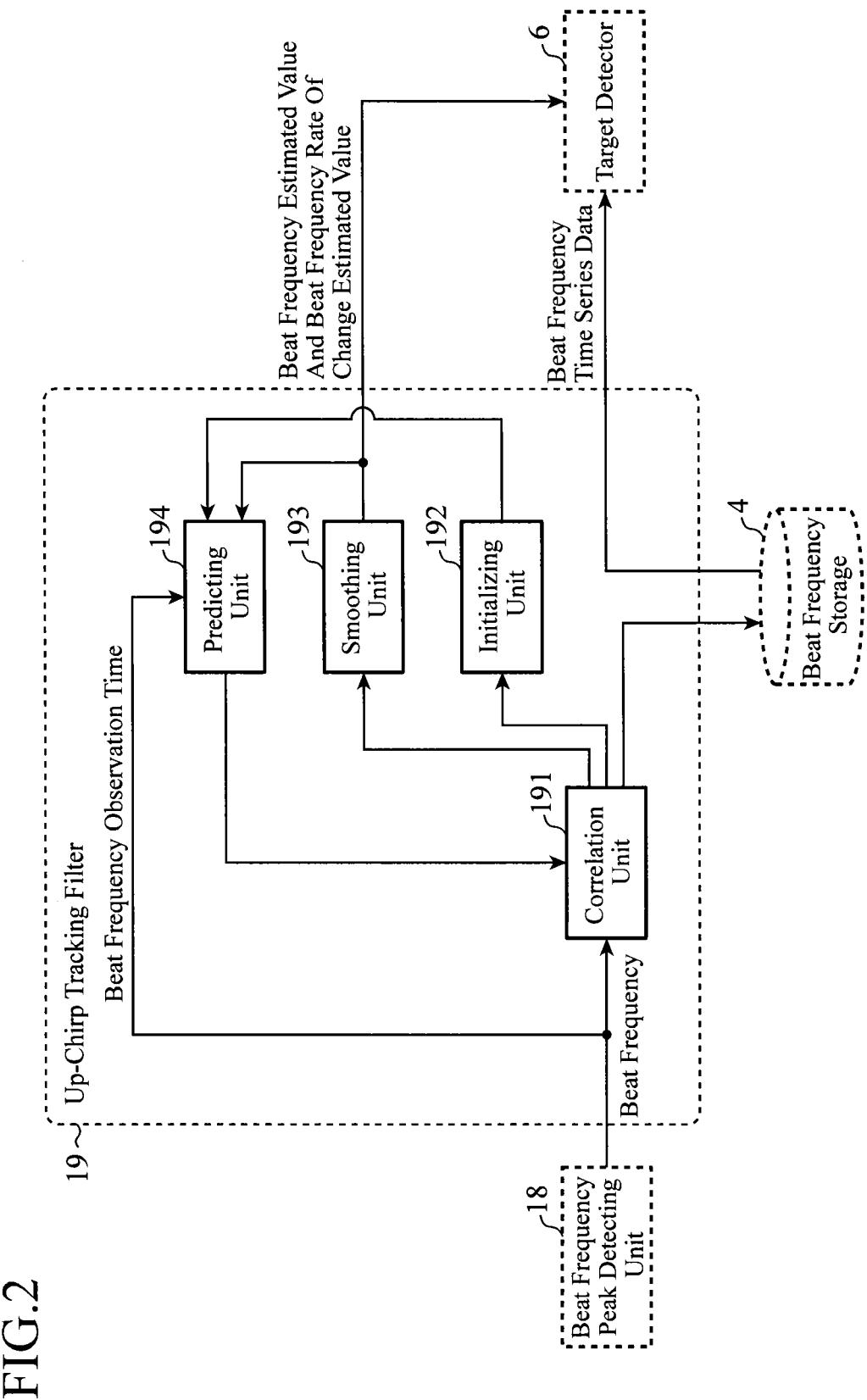
FIG. 2 is a diagram showing the structure of an up-chirp tracking filter in the radar device in accordance with Embodiment 1 of the present invention.

In Embodiment 3, an up-chirp tracking filter 19 shown in FIG. 2 outputs data showing smoothed values (beat frequency and beat frequency rate of change estimated values) from a smoothing unit 193 to a target detector 6 without outputting data showing a beat frequency from a correlation unit 191 to a beat frequency storage 4. Further, a down-chirp tracking filter 20 carries out the same outputting process.

On the basis of an update time added to the smoothed values (the beat frequency and beat frequency rate of change estimated values) of a target associated with an up-chirp from the up-chirp tracking filter 19, and an update time inputted to the time corrector 22, the time corrector 21 corrects the smoothed values in such a way that the smoothed values match a predetermined time. On the basis of an update time added to the smoothed values (the beat frequency and beat frequency rate of change estimated values) of a target associated with a down-chirp from the down-chirp tracking filter 20, and the update time inputted to the time corrector 21, the time corrector 22 corrects the smoothed values in such a way that the smoothed values match the predetermined time. At this time, in order to make the update time added to the smoothed values associated with each chirp match the predetermined time (e.g., the newest time), each of the time correctors 21 and 22 extrapolates a beat frequency estimated value at the predetermined time from the above-mentioned beat frequency estimated value on the basis of the beat frequency rate of change estimated value. Data showing the smoothed values corrected by these time correctors 21 and 22 are outputted to the distance and speed converters 23 and 24 respectively.

The distance and speed converter 23 converts the smoothed values associated with an up-chirp from the time corrector 21 into distance and speed estimated values. Data showing the distance and speed estimated values into which the smoothed values are converted by this distance and speed converter 23 are outputted to an identical target determinator 8. The distance and speed converter 24 converts the smoothed values associated with a down-chirp from the time corrector 22 into distance and speed estimated values. Data showing the distance and speed estimated values into which the smoothed values are converted by this distance and speed converter 24 are outputted to the identical target determinator 8.

The up-chirp angle tracking filter 25 carries out a tracking process on the basis of an angle measurement value added to the beat frequency associated with an up-chirp from a signal processing unit 2 to calculate angle and angular speed estimated values of a target. Data showing the angle and angular speed estimated values of the target associated with an up-chirp calculated by this up-chirp angle tracking filter 25 are outputted to the coordinate converter 27. The down-chirp angle tracking filter 25 carries out a tracking process on the basis of an angle measurement value added to the beat frequency associated with a down-chirp from the signal processing unit 2 to calculate angle and angular speed estimated values of the target. Data showing the angle and angular speed estimated values of the target associated with a down-chirp calculated by this down-chirp angle tracking filter 26 are outputted to the coordinate converter 27. The structure of the up-chirp angle tracking filter 25 and that of the down-chirp angle tracking filter 26 will be mentioned below.

The coordinate converter 27 converts the data showing the distance and speed estimated values of the target from the distance and speed calculator 11 and the data showing the angle and angular speed estimated values of the target associated with each the chirps from the up-chirp angle tracking filter 25 and the down-chirp angle tracking filter 26 into a two-dimensional position and a two-dimensional speed of the target.

The identical target determinator 8 determines whether or not the target detected for each chirp is an identical target on the basis of the data showing the distance and speed estimated values of the target from the distance and speed converters 23 and 24 and the data showing the angle and angular speed estimated values of the target associated with each of the chirps from the up-chirp angle tracking filter 25 and the down-chirp angle tracking filter 26.

Figure 8:
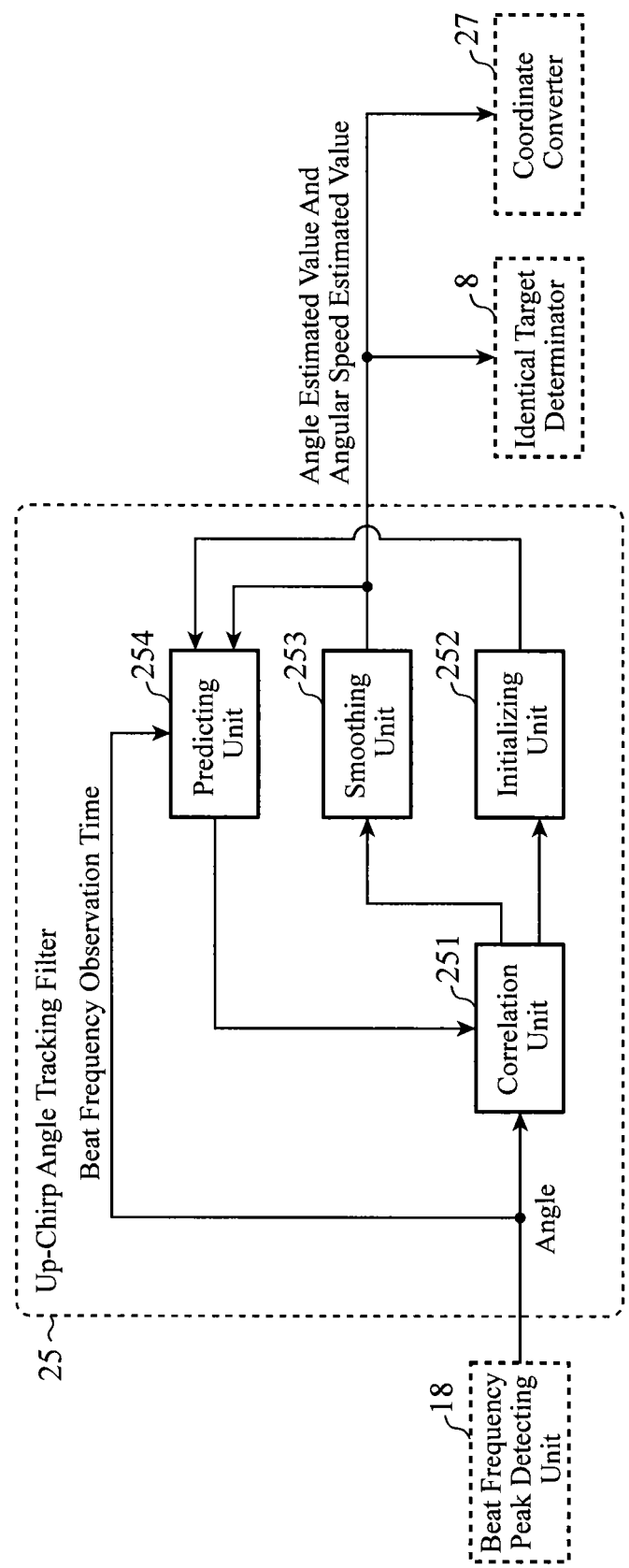
FIG. 8 is a diagram showing the structure of an up-chirp tracking filter in the radar device in accordance with Embodiment 3 of the present invention.

Next, the structure of the up-chirp angle tracking filter 25 and that of the down-chirp angle tracking filter 26 will be explained by using FIG. 8. Although only the structure of the up-chirp angle tracking filter 25 will be illustrated hereafter, the structure of the down-chirp angle tracking filter 26 is the same as that of the up-chirp angle tracking filter 25. The up-chirp angle tracking filter 25 is comprised of a correlation unit 251, an initializing unit 252, a smoothing unit 253, and a predicting unit 254, as shown in FIG. 8.

The correlation unit 251 carries out a correlation process of calculating a correlation with a predicted angle of a temporary target from the predicting unit 254 on an angle measurement value (angle) added to a beat frequency from a beat frequency peak detecting unit 18. When assuming that no correlation is established between them, the correlation unit 251 then outputs data showing the angle to the initializing unit 252. In contrast, when assuming that a correlation is established between them, the correlation unit 251 outputs the data showing the angle to the smoothing unit 253.

The initializing unit 252 sets up initial smoothed values (angle and angular speed estimated values) of a new temporary target on the basis of the angle which the correlation unit 251 determines does not have a correlation. The time that the angle is acquired is added to the smoothed values set up by the initializing unit 252. Data showing the smoothed values of the temporary target set up by this initializing unit 252 are outputted to the predicting unit 254.

The smoothing unit 253 updates the smoothed values (the angle and angular speed estimated values) of the temporary target on the basis of the angle which the correlation unit 251 determines has a correlation. The time that the angle is updated is added to the smoothed values of the temporary target updated by the smoothing unit 253. Data showing the smoothed values of the temporary target updated by this smoothing unit 253 are outputted to the predicting unit 254, the identical target determinator 8, and the coordinate converter 27.

The predicting unit 254 calculates the predicted angle of the temporary target on the basis of both data showing a beat frequency observation time from the beat frequency peak detecting unit 18 and the data showing the smoothed values of the temporary target from the initializing unit 252 or the smoothing unit 253. Data showing the predicted angle calculated by this predicting unit 254 is outputted to the correlation unit 251.

Figure 9:
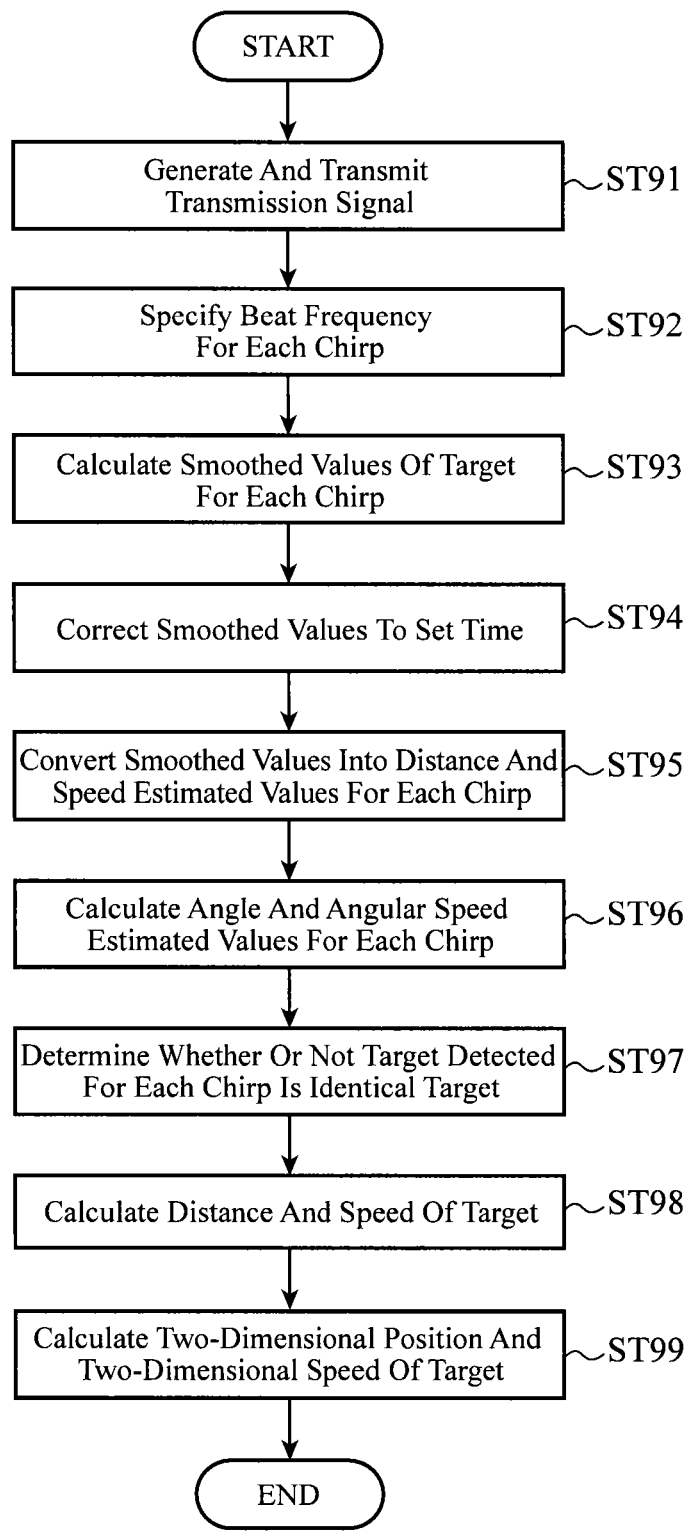
FIG. 9 is a flow chart showing the operation of the radar device in accordance with Embodiment 3 of the present invention.
Figure 10:
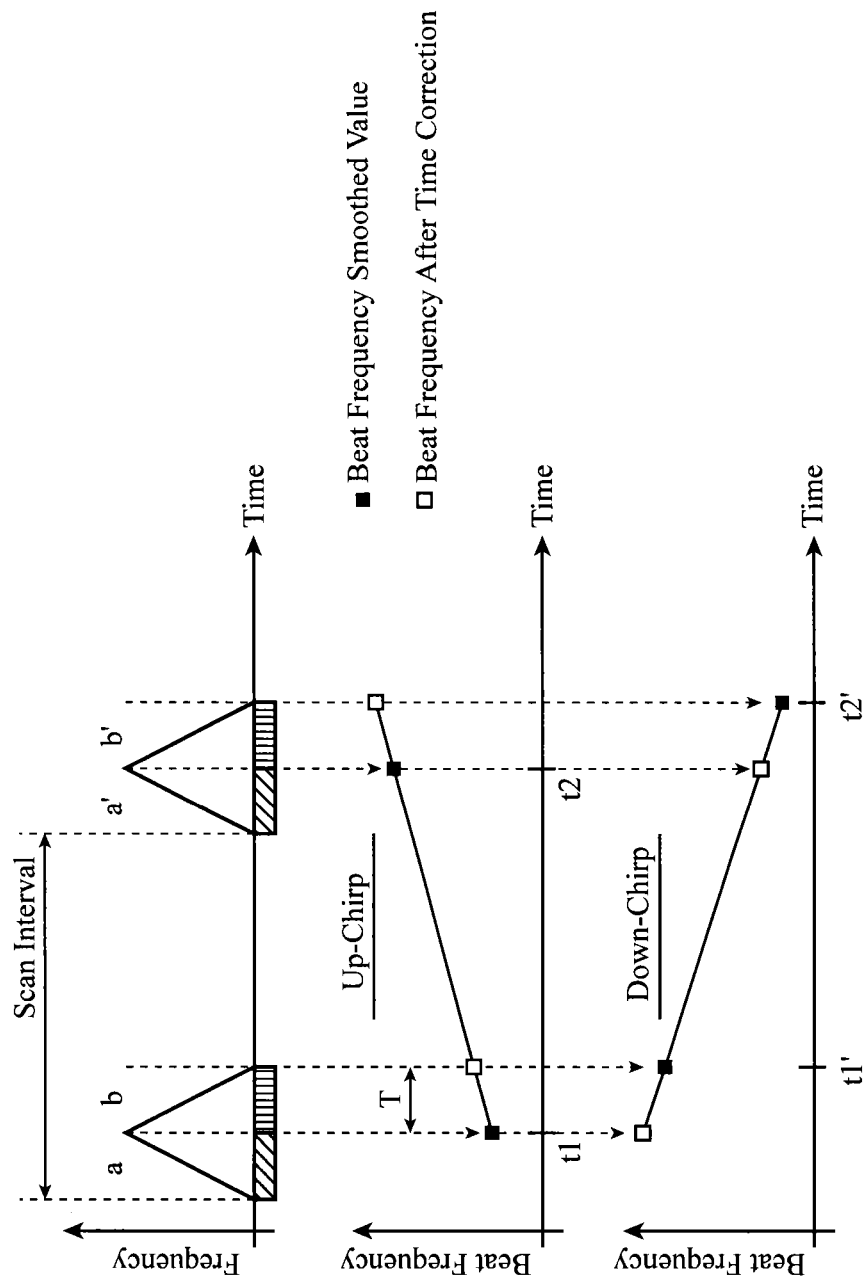
FIG. 10 is a diagram explaining the operation of a time corrector in the radar device in accordance with Embodiment 3 of the present invention.
Figure 17:
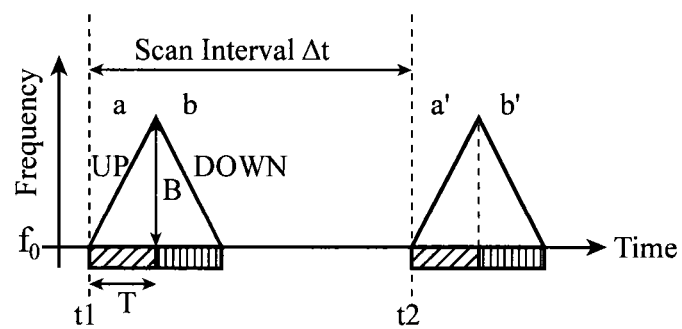
FIG. 17 is a diagram showing an example of a transmission pattern of the conventional radar device.
Figure 18:
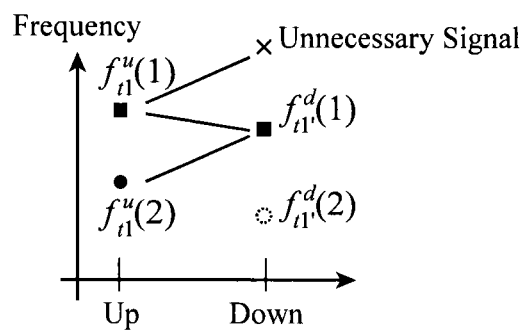
FIG. 18 is a diagram showing pairing of a beat frequency of the conventional radar device.
Figure 19:
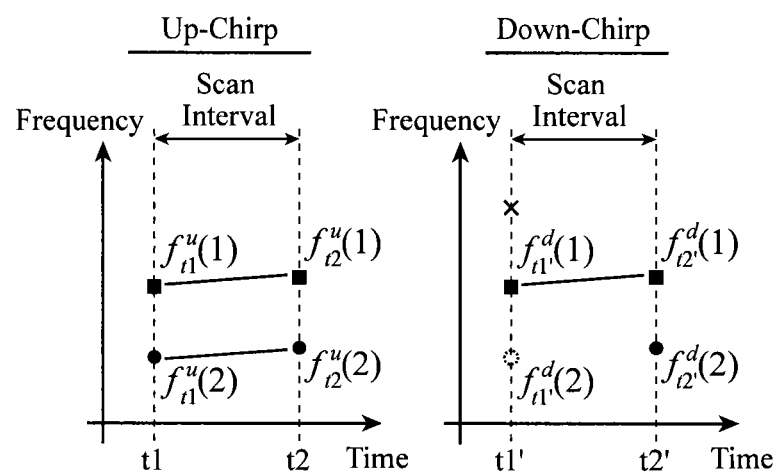
FIG. 19 is a diagram showing beat frequency time series data of the conventional radar device.

Next, the operation of the radar device constructed as above will be explained with reference to FIG. 9. Hereafter, only a portion different from the operation of the radar device in accordance with Embodiment 1 will be explained. In the operation of the radar device, as shown in FIG. 9, the time correctors 21 and 22, in step ST94, receive data showing smoothed values (beat frequency and beat frequency rate of change estimated values) of a target associated with each chirp and update times from the up-chirp tracking filter 19 and the down-chirp tracking filter 20 respectively, and corrects the smoothed values in such a way that the update times match a predetermined time. Hereafter, the details of the process carried out by the time corrector 21 will be explained using FIG. 10. FIG. 10 shows the beat frequency smoothed values associated with an up-chirp and a down-chirp in the case of a transmission pattern as shown in FIG. 17. Further, the time corrector 21 carries out the process according to the following equations (50) to (52).

As shown in FIG. 10, when the beat frequency rate of change is large, the beat frequency varies according to the difference between the acquisition time associated with the up-chirp (shown by a reference character a shown in FIG. 10) and the acquisition time associated with the down-chirp (shown by a reference character b shown in FIG. 10) not only during a scan interval, but also during an interval other than the scan interval. Therefore, in order to compensate for this variation in the beat frequency, the time of the smoothed values associated with the up-chirp and that of the smoothed values associated with the down-chirp are made to match each other. For example, when the difference between the update time to of the smoothed values associated with the up-chirp (e.g., t1 shown in FIG. 10) and an arbitrary time t (e.g., t1' shown in FIG. 10) is expressed as Δt (e.g., T shown in FIG. 10), the smoothed values at the arbitrary time can be calculated according to the equation (51). Because the same goes for the smoothed values associated with the down-chirp, an explanation of the process on the down-chirp will be omitted.

Through these processes by the time correctors 21 and 22, also for, for example, a transmission pattern in which a difference occurs between the acquisition time associated with the up-chirp and that associated with the down-chirp as shown in FIG. 10, the variation in the beat frequency can be compensated for.

$$x_{tu}^u = \begin{bmatrix} \hat{f}_{tu}^u & \hat{f}_{tu}^u \end{bmatrix}^T \tag{50}$$

$$x_t^u = \Phi' x_{tu}^u \tag{51}$$

$$\Phi' = \begin{bmatrix} 1 & \Delta t \\ 0 & 1 \end{bmatrix} \tag{52}$$

The distance and speed converter 23 then converts the smoothed values associated with the up-chirp from the time corrector 21 into distance and speed estimated values (step ST95). In this case, for example, two scans of the smoothed values are stored, and the distance and speed estimated values are calculated by using the equations (33) and (34). As an alternative, the distance and speed converter can calculate the distance and speed estimated values of the target by using the beat frequency estimated value $\hat{f}_t^u$ and the beat frequency rate of change estimated value $\hat{\dot{f}}_t^u$ associated with the up-chirp, and the equations (53) and (54).

$$\dot{R} = \frac{cT}{2B} \hat{\dot{f}}_t^u \tag{53}$$

$$R = \frac{cT \hat{f}_t^u}{2B} - \frac{f_0 T}{B} \dot{R} \tag{54}$$

Further, the distance and speed converter 24 carries out the same process as that carried out by the above-mentioned distance and speed converter 23. Because the process is the one on the down-chirp, the superscript u in each variable is changed to d in the equations, and the equation (54) in which the sign of the second term in the right side is changed to negative (−) is used.

The up-chirp angle tracking filter 25 then carries out a tracking process on the basis of the angle measurement value added to the beat frequency associated with the up-chirp from the signal processing unit 2, and calculates the angle and angular speed estimated values of the target (step ST96). Hereafter, the details of the process carried out by the up-chirp angle tracking filter 25 will be explained. This up-chirp angle tracking filter 25 carries out the process fundamentally according to the equations (5) to (26). However, because there is only one different portion in the process, this portion will be shown hereafter.

More specifically, a state vector having a temporary target number m (m=1, 2, ... M) which is used by the up-chirp angle tracking filter 25 is defined by equation (55), and a motion model of the state vector is defined by the equation (6). $\theta_k^u$ shows the angle, and $\dot{\theta}_k^u$ shows the angular speed. In addition, an observation matrix is defined by equation (57), and an observation model is defined by equation (56).

$$x_k^u(m) = [\theta_k^u \dot{\theta}_k^u]^T \tag{55}$$

$$\theta_k^u = H x_k^u + v_k \tag{56}$$

$$H = [1\ 0] \tag{57}$$

Further, the down-chirp angle tracking filter 26 carries out the same process as that by the above-mentioned up-chirp angle tracking filter 25. Because the process is the one on the down-chirp, the superscript u in each variable in the equations is changed to d.

The identical target determinator 8 then determines whether or not the target detected for each of the chirps is an identical target on the basis of the data showing the distance and speed estimated values of the target from the distance and speed converters 23 and 24 and the data showing the angle and angular speed estimated values of the target associated with each of the chirps from the up-chirp angle tracking filter 25 and the down-chirp angle tracking filter 26 (step ST97). Further, when information about a signal strength is added to the target detected for each of the chirps, the identical target determinator can determine whether or not the target detected for each of the chirps is an identical target by also taking into consideration the signal strength. For example, the process can be easily extended into a process of determining that targets having a large difference between the signal strengths, the pieces of information about these signal strengths being added to the targets, are not an identical target.

The distance and speed calculator 11 then calculates the distance and the speed of the target on the basis of the data showing the beat frequencies which are paired with each other from the identical target determinator 8 (step ST98). In this case, the distance and speed calculator 11 calculates the distance and the speed by using, instead of the beat frequencies given by the equations (3) and (4), the smoothed values of the beat frequencies, and defines them as the distance and speed estimated values.

The coordinate converter 27 then calculates a two-dimensional position and a two-dimensional speed of the target on the basis of the data showing the distance and speed estimated values of the target from the distance and speed calculator 11 and the data showing the angle and angular speed estimated values of the target associated with each of the chirps from the up-chirp angle tracking filter 25 and the down-chirp angle tracking filter 26 (step ST99). Hereafter, the details of the process carried out by the coordinate converter 27 will be explained. The coordinate converter 27 carries out the process according to the following equations (58) to (60).

The coordinate converter 27 selects either the angle and angular speed estimated values calculated independently by the up-chirp angle tracking filter 25 and the angle and angular speed estimated values calculated independently by the down-chirp angle tracking filter 26, or integrates the two sets of angle and angular speed estimated values. For example, from the angle and angular speed estimated values associated with the up-chirp and those associated with the down-chirp, outputs the angle and angular speed estimated values associated with one of the chirps which minimizes the volume of a smooth error covariance matrix given by the equation (19). As an alternative, the coordinate converter can carry out weighting integration on the angle and angular speed estimated values associated with an up-chirp and a down-chirp of targets which are determined to be an identical target by using the smooth error covariance matrix given by the equation (19) to calculate an angle estimated value $\hat{\theta}_k$ and an angular speed estimated value $\hat{\dot{\theta}}_k$. The coordinate converter 27 further uses equation (60) to convert the distance estimated value $\hat{R}_k$, the speed estimated value $\hat{\dot{R}}_k$, the angle estimated value $\hat{\theta}_k$, and the angular speed estimated value $\hat{\dot{\theta}}_k$ into a two-dimensional position and a two-dimensional speed, and outputs these values.

$$\hat{\theta}_k^u = (P_{k|k}^u(m) + P_{k|k}^d(n))^{-1} P_{k|k}^d(n) \theta_k^u(m) + (P_{k|k}^u(m) + P_{k|k}^d(n))^{-1} P_{k|k}^u(m) \theta_k^d(n) \tag{58}$$

$$\hat{\dot{\theta}}_k^u = (P_{k|k}^u(m) + P_{k|k}^d(n))^{-1} P_{k|k}^d(n) \dot{\theta}_k^u(m) + (P_{k|k}^u(m) + P_{k|k}^d(n))^{-1} P_{k|k}^u(m) \dot{\theta}_k^d(n) \tag{59}$$

$$\begin{bmatrix} \hat{x}_k \\ \hat{y}_k \\ \hat{v}_{x,k} \\ \hat{v}_{y,k} \end{bmatrix} = \begin{bmatrix} \hat{R}_k \sin\hat{\theta}_k \\ \hat{R}_k \cos\hat{\theta}_k \\ \hat{\dot{R}}_k \sin\hat{\theta}_k + \hat{R}_k \hat{\dot{\theta}}_k \cos\hat{\theta}_k \\ \hat{\dot{R}}_k \cos\hat{\theta}_k + \hat{R}_k \hat{\dot{\theta}}_k \sin\hat{\theta}_k \end{bmatrix} \tag{60}$$

Because the other processes are the same as those in accordance with Embodiment 1, an explanation of the processes will be omitted hereafter.

As mentioned above, because the radar device in accordance with Embodiment 3 is constructed in such a way as to correct the smoothed values to the ones at an arbitrary time by using the smoothed values and the update time added to these smoothed values, the radar device provides an advantage of, even when the difference (modulation time) between the beat frequency acquisition time associated with an up-chirp and that associated with a down-chirp is large, improves the estimation accuracy in the pairing between an up-chirp and a down-chirp. Further, because an observation error is included in the distance and the speed outputted in Embodiments 1 and 2, a process of reducing the error using a tracking filter or the like in a subsequent stage is required in order to acquire a desired degree of estimation accuracy. In contrast, in accordance with this embodiment, because the two-dimensional position and the two-dimensional speed are calculated from both the pair of the beat frequency smoothed values in each of which an observation error included in the beat frequency is reduced by using the tracking filter and the angle estimated value in which an observation error included in the angle measurement value is reduced through the tracking process, the estimation accuracy is improved. In addition, the process carried out by the tracking filter in a subsequent stage can be eliminated.

Embodiment 4

Figure 11:
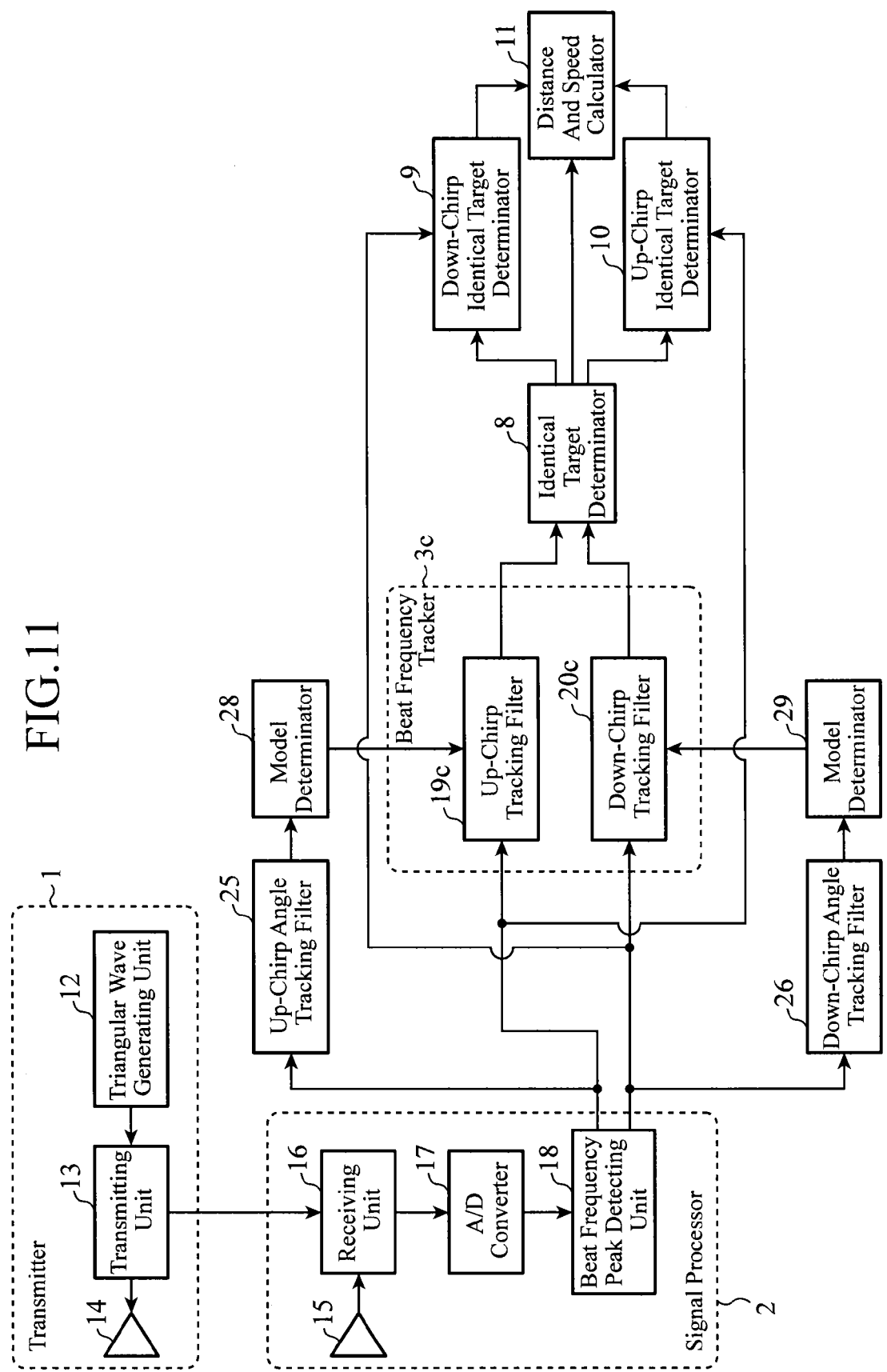
FIG. 11 is a diagram showing the structure of a radar device in accordance with Embodiment 4 of the present invention.

FIG. 11 is a diagram showing the structure of a radar device in accordance with Embodiment 4 of the present invention. In the radar device in accordance with Embodiment 4 shown in FIG. 11, the beat frequency storages 4 and 5 and the target detectors 6 and 7 of the radar device in accordance with Embodiment 1 which are shown in FIG. 1 are removed, and an up-chirp angle tracking filter 25, a down-chirp angle tracking filter 26, and model determinators 28 and 29 are additionally disposed and the beat frequency tracker 3 is replaced by a beat frequency tracker 3c. The other structural components are the same as those in accordance with Embodiment 1 and are designated by the same reference numerals, and the explanation of the components will be omitted hereafter.

On the basis of data showing angle and angular speed smoothed values from the up-chirp angle tracking filter 25, the model determinator 28 selects a motion model of a tracking filter (a fixed speed model or a non-fixed speed model). On the basis of data showing angle and angular speed smoothed values from the down-chirp angle tracking filter 26, the model determinator 29 selects a motion model of a tracking filter (a fixed speed model or a non-fixed speed model).

According to the motion models selected by the model determinators 28 and 29, the beat frequency tracker 3c carries out tracking processes on the basis of data showing a beat frequency associated with each chirp from a signal processor 2 respectively, and calculates distance and speed estimated values of a target or distance, speed and acceleration estimated values of a target on the basis of the beat frequency of the target acquired for each chirp. This beat frequency tracker 3c has an up-chirp tracking filter 19c and a down-chirp tracking filter 20c.

According to the motion model selected by the model determinator 28, the up-chirp tracking filter 19c carries out a tracking process on the basis of the data showing the beat frequency (frequency peaks) associated with an up-chirp from the signal processor 2 to acquire a frequency peak having a correlation among plural sampled up-chirps as a beat frequency of a target. Then, according to the selected motion model, the up-chirp tracking filter calculates the distance and speed estimated values of the target or the distance, speed and acceleration estimated values of the target on the basis of the beat frequency. Data showing this beat frequency of the target acquired by the up-chirp tracking filter 19c and the distance and speed estimated values or the distance, speed and acceleration estimated values which are calculated by the up-chirp tracking filter are outputted to an identical target determinator 8. According to the motion model selected by the model determinator 29, the down-chirp tracking filter 20c carries out a tracking process on the basis of the data showing the beat frequency (frequency peaks) associated with a down-chirp from the signal processor 2 to acquire a frequency peak having a correlation among plural sampled up-chirps as a beat frequency of a target. Then, according to the selected motion model, the down-chirp tracking filter calculates the distance and speed estimated values of the target or the distance, speed and acceleration estimated values of the target on the basis of the beat frequency. Data showing this beat frequency of the target acquired by the down-chirp tracking filter 20c and the distance and speed estimated values or the distance, speed and acceleration estimated values which are calculated by the down-chirp tracking filter are outputted to the identical target determinator 8.

Figure 12:
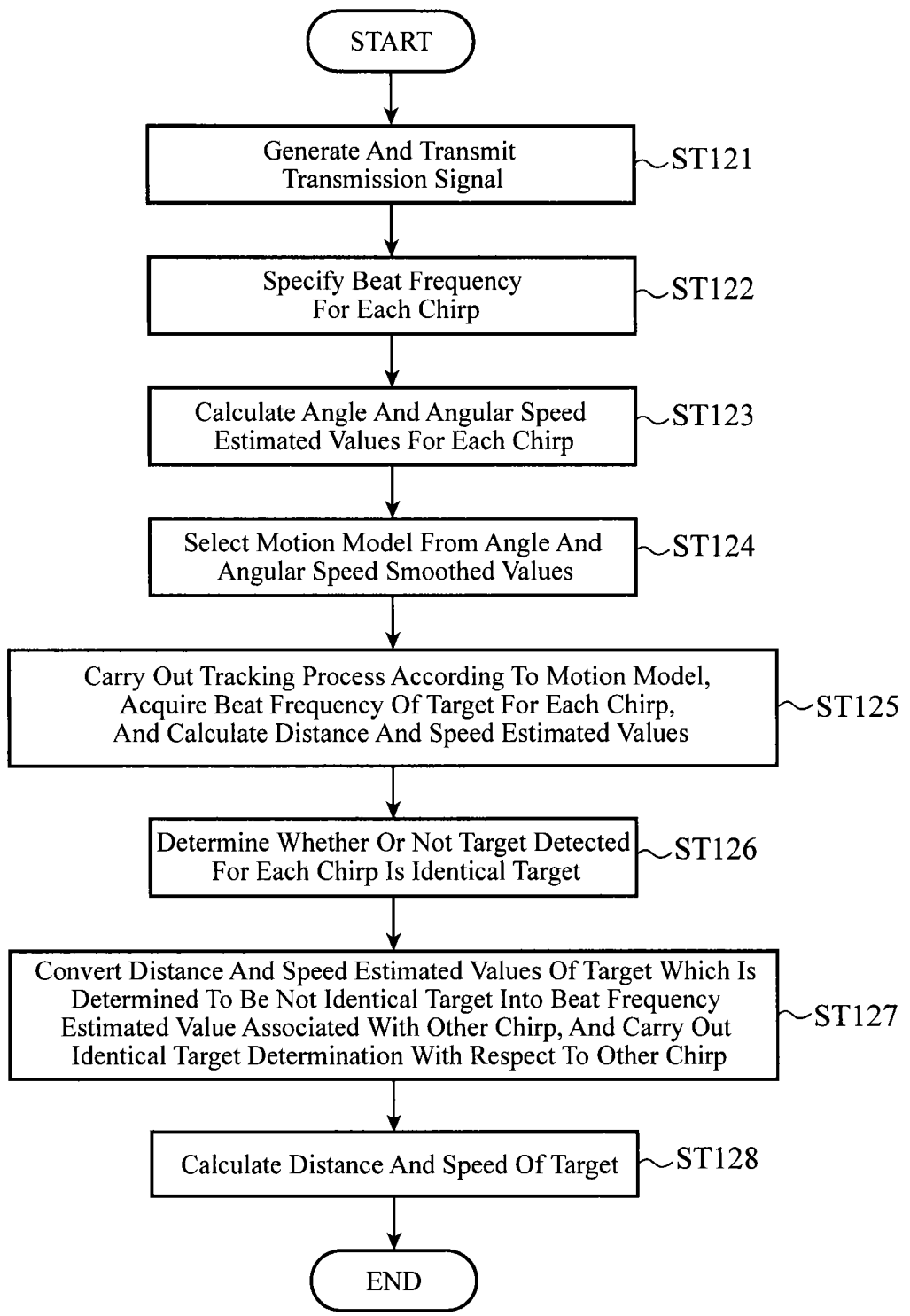
FIG. 12 is a flow chart showing the operation of the radar device in accordance with Embodiment 4 of the present invention.

Next, the operation of the radar device constructed as above will be explained with reference to FIG. 12. Hereafter, only a portion different from the operation of the radar device in accordance with Embodiment 1 will be explained. In the operation of the radar device, as shown in FIG. 12, the model determinator 28, in step ST124, selects a motion model of the tracking filter on the basis of the data showing the angle and angular speed smoothed values from the up-chirp angle tracking filter 25. Hereafter, the details of the process carried out by the model determinator 28 will be explained with reference to FIGS. 13 to 15. The model determinator 28 carries out the process according to the following equations (61) to (64).

Figure 13:
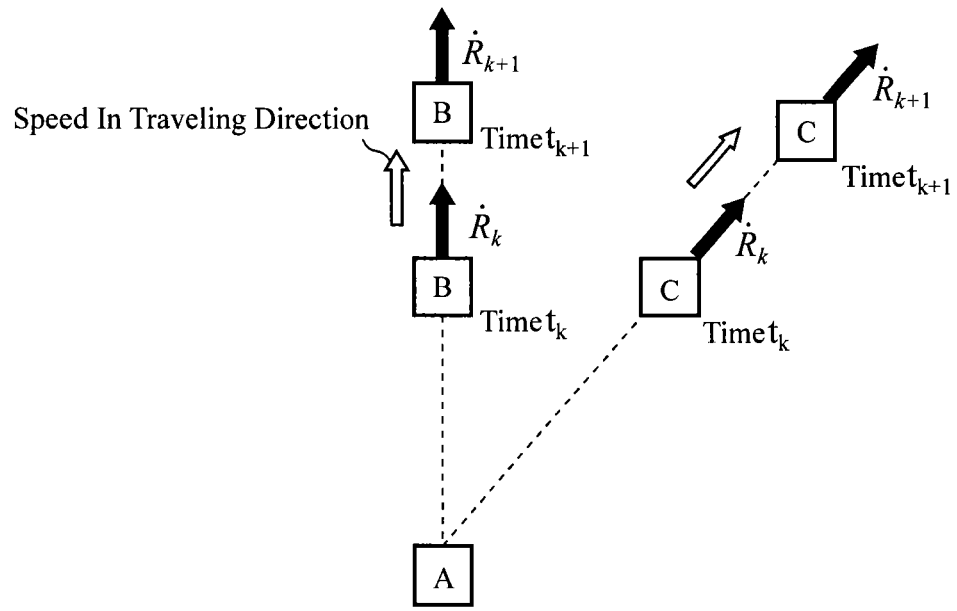
FIG. 13 is a diagram explaining the operation of a model determinator in the radar device in accordance with Embodiment 4 of the present invention (in a case in which speed constancy is established)
Figure 14:
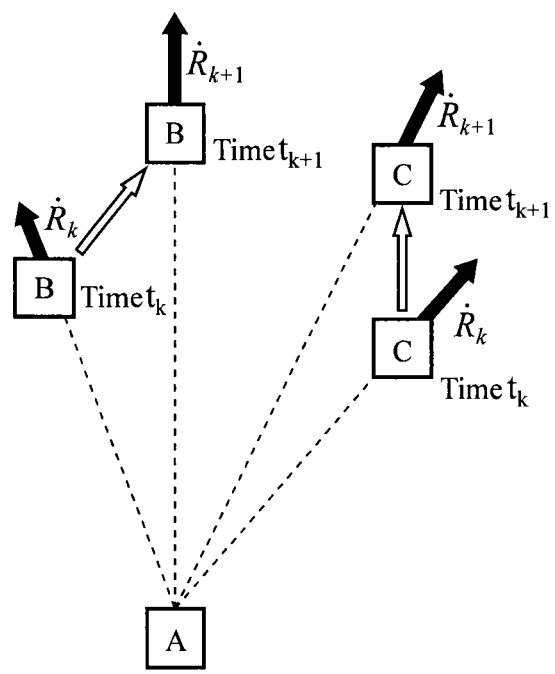
FIG. 14 is a diagram explaining the operation of a model determinator in the radar device in accordance with Embodiment 4 of the present invention (in a case in which speed constancy is not established)

A in FIGS. 13 and 14 shows the radar device, and B and C show targets travelling at a constant speed. FIG. 13 shows a state in which the targets B and C are travelling in a direction of going away from the radar device A, and therefore their speeds (Doppler speeds) in the sight line direction are fixed. In contrast with this, FIG. 14 shows a state in which the targets B and C are travelling also in a direction other than the sight line direction, and therefore their Doppler speeds are changing even though they are moving at a constant speed. Although a tracking process (equation (46)) based on a state vector formed of a distance and a speed is suitable for a case of tracking a target travelling at a constant speed in the sight line direction from the radar device, as shown in FIG. 13, the tracking process is not suitable for a case of tracking a target whose speed in the sight line direction changes, such as a target travelling in a lateral direction before the radar device, as shown in FIG. 14. Therefore, the radar device determines whether to select either a fixed speed model or a non-fixed speed model for each target.

Figure 15:
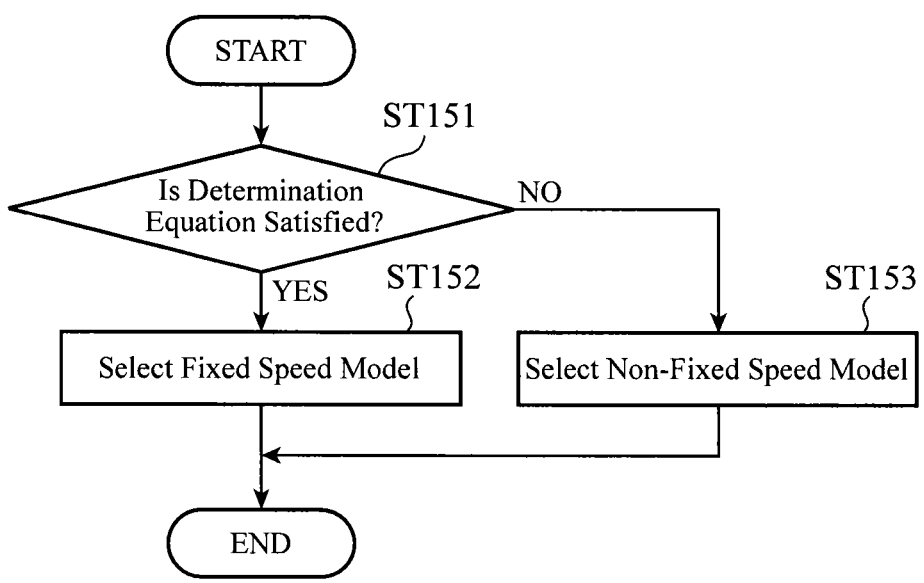
FIG. 15 is a flow chart showing the operation of the model determinator in the radar device in accordance with Embodiment 4 of the present invention.
Figure 16:
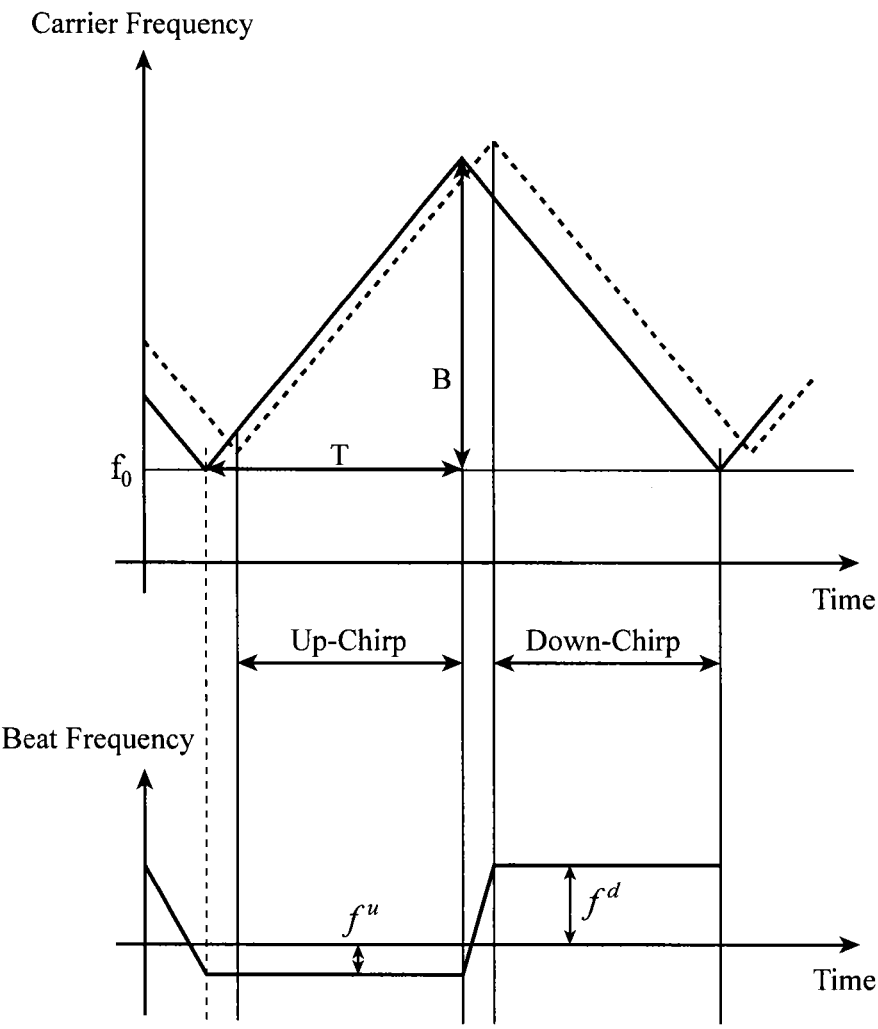
FIG. 16 is a diagram explaining a principle behind the operation of a conventional radar device.

More specifically, the model determinator 28 determines whether or not determination equations (61) and (62) are satisfied first, as shown in FIG. 15 (step ST151). When the above-mentioned determination equations are satisfied (when an angular speed estimated value is equal to or smaller than a threshold Thdθ or has a degree of speed estimation accuracy equal to or less than a certain degree of speed estimation accuracy $\sigma_{\dot{\theta}}$), the model determinator selects a fixed speed model (step ST152). In contrast, when the above-mentioned determination equations are not satisfied, the model determinator selects a non-fixed speed model (step ST153). In a situation in which the premise that a target just in front of the radar device has a constant speed is established, when an angle observed value is equal to or smaller than a threshold Thθ or has a degree of angle estimation accuracy $\sigma_\theta$, as shown in equations (63) and (64), the model determinator selects a fixed speed model, or otherwise, selects a non-fixed speed model.

$$\hat{\dot{\theta}}_k^u \le Thd\theta \tag{61}$$

$$\hat{\dot{\theta}}_k^u \le \sigma_{\dot{\theta}} \tag{62}$$

$$\theta_k^u \le Th\theta \tag{63}$$

$$\theta_k^u \le \sigma_\theta \tag{64}$$

Further, the model determinator 29 carries out the same process as that carried out by the above-mentioned model determinator 28.

In this case, the superscript u in each variable in the equations is changed to d.

According to the motion models selected by the model determinators 28 and 29, the beat frequency tracker 3c then carries out the tracking processes on the basis of the data showing the beat frequency associated with each of the chirps from the signal processor 2 respectively, and calculates the distance and speed estimated values of a target or the distance, speed and acceleration estimated values of a target on the basis of the beat frequency of the target acquired for each of the chirps (step ST125). Hereafter, the details of the process carried out by the up-chirp tracking filter 19c will be explained. The up-chirp tracking filter 19c carries out the process according to the following equations (65) to (67).

When a fixed speed model is selected by the model determinator 28, the up-chirp tracking filter 19c carries out the tracking process in which the distance and the speed, in the equation (46), are defined as the state vector, like the up-chirp tracking filter 19b in accordance with Embodiment 2. Further, the value of the driving noise covariance matrix $Q_k$ of a Kalman filter is decreased. In contrast, when a non-fixed speed model is selected by the model determinator 28, the up-chirp tracking filter 19c carries out the tracking process including, for example, an acceleration term. In this case, the state vector of the tracking filter is defined by the equation (65), an observation matrix is defined by the equation (66), and a state transition matrix is defined by the equation (67). Further, in the tracking process in which the distance and the speed, in the equation (65), are defined as the state vector, a process of increasing the value of the driving noise covariance matrix $Q_k$ of the Kalman filter can be carried out.

$$x_k^u(m) = \begin{bmatrix} R_k^u & \dot{R}_k^u & \ddot{R}_k^u \end{bmatrix}^T \quad (65)$$

$$H = \begin{bmatrix} \frac{2B}{cT} & \frac{2f_0}{c} & 0 \end{bmatrix} \quad (66)$$

$$\Phi_k = \begin{bmatrix} 1 & \Delta t & \Delta t^2/2 \\ 0 & 1 & \Delta t \\ 0 & 0 & 1 \end{bmatrix} \quad (67)$$

Because the other processes are the same as those in accordance with Embodiment 2, an explanation of the processes will be omitted hereafter.

As mentioned above, because the radar device in accordance with Embodiment 4 is constructed in such a way as to change the motion model of the tracking filter by using the angle and angular speed estimated values and carry out the tracking process, the radar device can improve the accuracy of estimating the distance and the accuracy of estimating the speed as compared with that in accordance with Embodiment 1.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

As mentioned above, because the radar device in accordance with the present invention calculates distance and speed estimated values by carrying out a tracking process for each chirp using a beat frequency, and pairs a beat frequency associated with an up-chirp with a beat frequency associated with a down-chirp by using the above-mentioned distance and speed estimated values, thereby being able to improve the accuracy of estimating the distance and the accuracy of estimating the speed, and is suitable for use as a radar device, such as an FMCW radar, which is used for avoidance of collision of a moving object, travelling while keeping a fixed following distance, etc., and which detects a relative speed and a distance with respect to a target existing outside the moving object by using transmission and reception of a radar wave.

EXPLANATIONS OF REFERENCE NUMERALS

1 transmitter, 2 signal processor, 3, 3b, and 3c beat frequency tracker, 4 and 5 beat frequency storage, 6 and 7 target detector, 8 identical target determinator, 9 down-chirp identical target determinator, 10 up-chirp identical target determinator, 11 distance and speed calculator, 12 triangular wave generating unit, 13 transmitting unit, 14 transmitting antenna, 15 receiving antenna, 16 receiving unit, 17 A/D converter, 18 beat frequency peak detecting unit, 19, 19b, and 19c up-chirp tracking filter, 20, 20b, and 20c down-chirp tracking filter, 21 and 22 time corrector, 23 and 24 distance and speed converter, 25 up-chirp angle tracking filter, 26 down-chirp angle tracking filter, 27 coordinate converter, 28 and 29 model determinator, 191,191b and 251 correlation unit, 192,192b and 252 initializing unit, 193,193b and 253 smoothing unit, 194,194b and 254 predicting unit.

The invention claimed is:

1. A radar device comprising:
a transmitter that transmits, as a radar wave, a transmission signal whose frequency is increased and decreased linearly and periodically by a fixed modulation width;
a signal processor that receives a reflected wave generated by reflection of the radar wave transmitted by said transmitter from a target and generates a received signal, and that specifies a beat frequency for each chirp on a basis of said received signal and said transmission signal;
an up-chirp tracking filter that carries out a tracking process on a basis of the beat frequency associated with an up-chirp specified by said signal processor to acquire a beat frequency of the target, and that calculates distance and speed estimated values of the target on a basis of said beat frequency;
a down-chirp tracking filter that carries out a tracking process on a basis of the beat frequency associated with a down-chirp specified by said signal processor to acquire a beat frequency of the target, and that calculates distance and speed estimated values of the target on a basis of said beat frequency;
an up-chirp angle tracking filter that carries out a tracking process on a basis of an angle measurement value added to the beat frequency associated with an up-chirp specified by said signal processor, and calculates angle and angular speed estimated values of the target;
a down-chirp angle tracking filter that carries out a tracking process on a basis of an angle measurement value added to the beat frequency associated with a down-chirp specified by said signal processor, and calculates angle and angular speed estimated values of the target;
an identical target determinator that determines whether or not the target detected for each of the chirps is an identical target on a basis of said distance and speed estimated values of the target and said angle and angular speed estimated values of the target; and
a distance and speed calculator that calculates a distance and a speed of the target on a basis of the beat frequency, for each of the chirps, of the target which is determined to be an identical target by said identical target determinator.

2. The radar device according to claim 1, wherein said radar device includes: a model determinator that selects a motion model of a tracking filter on a basis of the angular speed estimated value of the target which is calculated for the chirps by said up-chirp angle tracking filter and said down-chirp angle tracking filter respectively, and wherein said up-chirp tracking filter and said down-chirp tracking filter carry out their tracking processes according to the motion model selected by said model determinator.

3. The radar device according to claim 1, wherein said radar device includes: a down-chirp identical target determinator that converts the distance and speed estimated values of the target associated with an up-chirp which is determined to be not an identical target by said identical target determinator into a beat frequency estimated value associated with a down-chirp, and that determines whether or not said target is an identical target on a basis of both said beat frequency estimated value and the beat frequency associated with a down-chirp specified by said signal processor; and an up-chirp identical target determinator that converts the distance and speed estimated values of the target associated with a down-chirp which is determined to be not an identical target by said identical target determinator into a beat frequency estimated value associated with an up-chirp, and that determines whether or not said target is an identical target on a basis of both said beat frequency estimated value and the beat frequency associated with an up-chirp specified by said signal processor.

4. The radar device according to claim 2, wherein said up-chirp tracking filter and said down-chirp tracking filter calculate the distance and speed estimated values of the target when a fixed speed model is selected by said model determinator, and calculates the distance and speed estimated values of the target and an acceleration estimated value when a non-fixed speed model is selected by said model determinator.

5. The radar device according to claim 2, wherein said up-chirp tracking filter and said down-chirp tracking filter change driving noise of their tracking filters according to the motion model selected by said model determinator.

6. The radar device according to claim 1, wherein said up-chirp tracking filter carries out a tracking process on a basis of the beat frequency associated with an up-chirp specified by said signal processor to calculate beat frequency and beat frequency rate of change estimated values of the target and said down-chirp tracking filter carries out a tracking process on a basis of the beat frequency associated with a down-chirp specified by said signal processor to calculate beat frequency and beat frequency rate of change estimated values of the target, and wherein said radar device further comprises:
    a time corrector that, on a basis of a time added to the beat frequency and beat frequency rate of change estimated values of the target calculated for each of the chirps by said up-chirp tracking filter and said down-chirp tracking filter, corrects said beat frequency and beat frequency rate of change estimated values in such a way that the time matches a predetermined time; and
    a distance and speed converter that converts the beat frequency and beat frequency rate of change estimated values for each of the chirps corrected by said time corrector into distance and speed estimated values of the target.

7. The radar device according to claim 6, wherein said radar device further comprises a coordinate converter that converts the distance and speed estimated values of the target calculated for each of the chirps by said distance and speed calculator and the beat frequency and beat frequency rate of change estimated values calculated for each of the chirps by said up-chirp angle tracking filter and said down-chirp angle tracking filter into a two-dimensional position and a two-dimensional speed of the target.

8. The radar device according to claim 7, wherein said coordinate converter carries out weighting integration on the angle and angular speed estimated values of the target calculated for each of the chirps by said up-chirp angle tracking filter and said down-chirp angle tracking filter, and uses the angle and angular speed estimated values.

9. The radar device according to claim 6, wherein said time corrector extrapolates a beat frequency estimated value at said predetermined time from said beat frequency estimated value on a basis of said beat frequency rate of change estimated value.

\* \* \* \* \*